US008141890B2

(12) United States Patent
Hughes et al.

(10) Patent No.: US 8,141,890 B2
(45) Date of Patent: Mar. 27, 2012

(54) VEHICLE WITH LOCKABLE TILT SYSTEM

(75) Inventors: Peter S. Hughes, South Harwich, MA (US); Andrew H. Twombly, New Bedford, MA (US); Craig Bliss, Taunton, MA (US)

(73) Assignee: Vectrix International Limited, Hong Kong (HK)

( * ) Notice: Subject to any disclaimer, the term of this patent is extended or adjusted under 35 U.S.C. 154(b) by 384 days.

(21) Appl. No.: 12/298,752

(22) PCT Filed: Apr. 25, 2007

(86) PCT No.: PCT/US2007/067389
§ 371 (c)(1),
(2), (4) Date: May 20, 2009

(87) PCT Pub. No.: WO2007/127783
PCT Pub. Date: Nov. 8, 2007

(65) Prior Publication Data
US 2010/0044977 A1     Feb. 25, 2010

Related U.S. Application Data

(60) Provisional application No. 60/794,839, filed on Apr. 26, 2006.

(51) Int. Cl.
*B62D 9/02* (2006.01)
(52) U.S. Cl. ............... 280/124.103; 180/210; 280/5.509
(58) Field of Classification Search ............... 180/210, 180/213, 214, 216, 65.1, 65.21, 65.31, 65.6, 180/908; 280/5.508, 5.509, 5.51, 124.103
See application file for complete search history.

(56) References Cited

U.S. PATENT DOCUMENTS 2,887,322 A    5/1969 DeMonge
3,572,456 A *  3/1971 Healy ........................... 180/217
(Continued)

FOREIGN PATENT DOCUMENTS
DE    3611417    10/1987
(Continued)

OTHER PUBLICATIONS

International Preliminary Report on Patentability for PCT/US2007/06739 issued Oct. 28, 2008, 6 pages.

(Continued)

*Primary Examiner* — Paul N Dickson
*Assistant Examiner* — Laura Freedman
(74) *Attorney, Agent, or Firm* — Stephen C. Beuerle; Procopio Cory Hargreaves & Savitch LLP

(57) ABSTRACT

A vehicle that includes a vehicle body and a vehicle support assembly. The vehicle body has a longitudinal axis and is configured for supporting a rider thereon. The support assembly includes first (421A) and second (421B) tilting wheels disposed respectively at different lateral positions with respect to the longitudinal axis, a tilt-mechanism (452) supportively associating the vehicle body from the tilting wheels to enable the vehicle body to tilt through a first tilt range with respect to a surface on which the tilting wheels are disposed, and a tilt-limiter (456) operably associated with the tilt-mechanism (452) to restrict the tilting of the vehicle body to less than the first tilt range, and releasable to allow the tilting through the first tilt range.

16 Claims, 12 Drawing Sheets

U.S. PATENT DOCUMENTS

| | | | | |
|---|---|---|---|---|
| 3,601,213 | A * | 8/1971 | Patin | 180/215 |
| 3,746,118 | A * | 7/1973 | Altorfer | 180/210 |
| 4,064,957 | A * | 12/1977 | Parham | 180/215 |
| 4,126,322 | A * | 11/1978 | Mika | 280/5.508 |
| 4,351,410 | A * | 9/1982 | Townsend | 180/210 |
| 4,484,648 | A | 11/1984 | Jephcott | |
| 4,634,137 | A * | 1/1987 | Cocksedge | 280/256 |
| 4,740,004 | A | 4/1988 | McMullen | |
| 5,343,973 | A * | 9/1994 | Lanker | 180/211 |
| 5,730,453 | A * | 3/1998 | Owsen | 280/282 |
| 5,762,351 | A | 6/1998 | Soohoo | |
| 6,015,022 | A * | 1/2000 | Thuliez | 180/210 |
| 6,021,862 | A * | 2/2000 | Sharan | 180/216 |
| 6,326,765 | B1 | 12/2001 | Hughes et al. | |
| 6,724,165 | B2 | 4/2004 | Hughes | |
| 6,805,362 | B1 * | 10/2004 | Melcher | 280/5.52 |
| 6,817,617 | B2 * | 11/2004 | Hayashi | 280/5.509 |
| 7,487,985 | B1 * | 2/2009 | Mighell | 280/124.103 |
| 7,494,141 | B2 * | 2/2009 | Bouton | 280/124.103 |
| 7,530,419 | B2 * | 5/2009 | Brudeli | 180/210 |
| 7,552,790 | B2 * | 6/2009 | Dower | 180/210 |
| 7,568,541 | B2 * | 8/2009 | Pfeil et al. | 180/210 |
| 2005/0092538 | A1 | 5/2005 | Baldwin et al. | |
| 2008/0238005 | A1 * | 10/2008 | James | 280/5.509 |

FOREIGN PATENT DOCUMENTS

| | | |
|---|---|---|
| EP | 087663 | 12/1999 |
| EP | 0876263 | 12/1999 |
| EP | 1 180 476 | 2/2002 |
| EP | 180476 | 2/2002 |
| FR | 2872773 A1 | 1/2006 |
| WO | W09727071 A1 | 7/1997 |
| WO | WO 98/43872 | 10/1998 |
| WO | WO 01/36253 | 5/2001 |
| WO | WO0136253 | 5/2001 |

OTHER PUBLICATIONS

Extended European Search Report for EP11002880.0 dated Jun. 6, 2011, 7 pages.

International Search Report for International Application No. PCT/US2007/067389 dated Sep. 20, 2007.

* cited by examiner

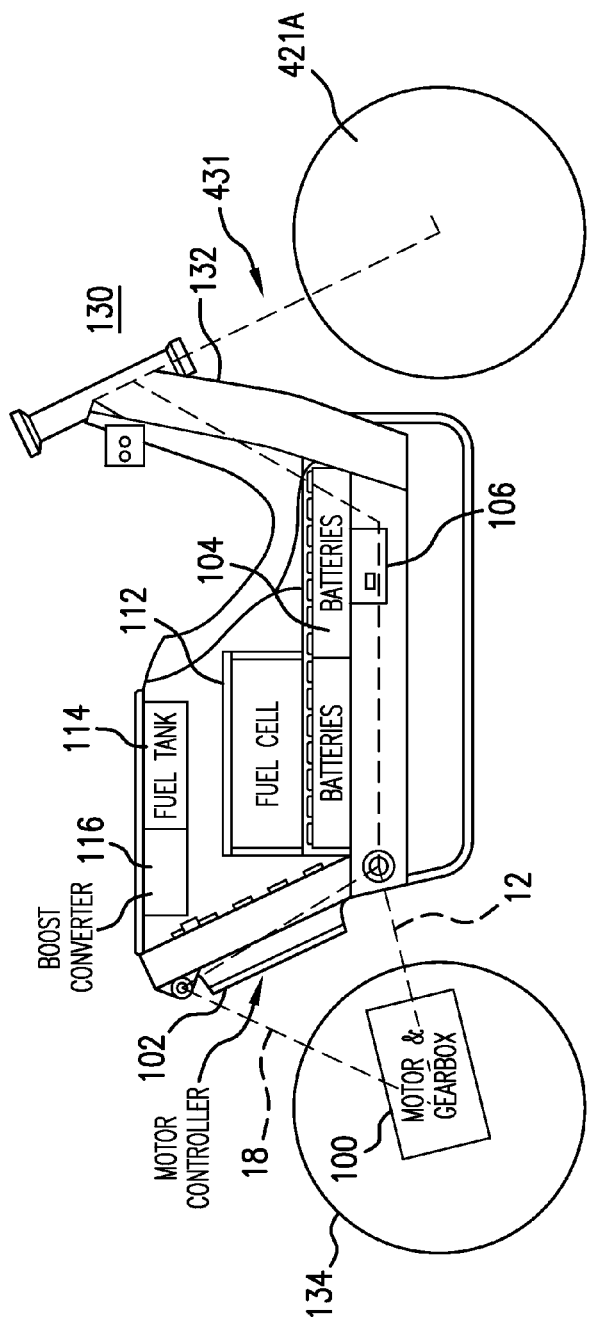
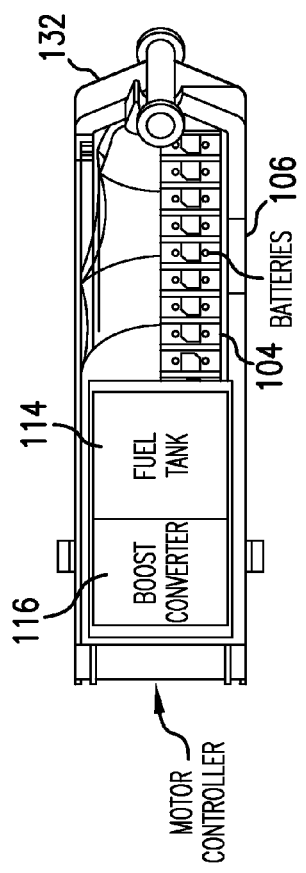
FIG.11A
FIG.11B

VEHICLE WITH LOCKABLE TILT SYSTEM

This application is a national stage application of PCT Application No. PCT/US2007/067389 which was filed on Apr. 25, 2007, and published on Nov. 8, 2007 as International Publication No. WO 2007/127783 (the "International Application"). This application claims priority from the International Application pursuant to 35 U.S.C. §371, and from U.S. Provisional Patent Application No. 60/794,839 filed Apr. 26, 2006, under 35 U.S.C. §119(e). The disclosures of the above-referenced applications are incorporated herein by reference in their entireties.

FIELD OF THE INVENTION

The present invention relates generally to a vehicle with a tilt-mechanism. More particularly, the invention relates to a vehicle with a tilt-mechanism that can be locked or limited.

BACKGROUND OF THE INVENTION

Vehicles having two, three, or more wheels are generally known. Within this genus of vehicles, certain types of tilting three-wheeled vehicles are known, such as the STREAM™ and CANOPY™ scooter of Honda and the ELLISSE™ scooter of Protos, which is described in WO 98/43872. The CANOPY™ scooter, for example, has two rear wheels supported by a track hinged on the frame of the scooter to pivot about the longitudinal axis thereof. The axis of the rear wheels does not tilt when the scooter takes curves, but remains parallel to the ground.

Three-wheeled vehicles are also known having one driving rear wheel and two steering front wheels. For example, European Patent Application No. EP1180476 B1 describes a laterally tilting three-wheeled vehicle having two steering front wheels. This vehicle has improved roadholding capabilities to keep the center of gravity between the wheels to reduce or prevent rollover.

Electric vehicles are known with on-board charging system as described in U.S. Pat. No. 6,326,765, with a composite frame as described in U.S. Published Application No. 2005/0092538, and with a regenerative braking system as described in U.S. Pat. No. 6,724,165.

There remains, however, a need to assist the rider in keeping a vehicle upright or keeping it from tipping over when moving at slow speeds or when stopped, especially for small and light-weight riders.

SUMMARY OF THE INVENTION

A preferred embodiment of the present invention relates to a vehicle support assembly that includes a first and second tilting wheels disposed respectively at different lateral positions with respect to a longitudinal axis, a tilt-mechanism configured for supportively associating a vehicle body from the tilting wheels to enable the vehicle body to tilt through a first tilt range with respect to a surface on which the tilting wheels are disposed, and a tilt-limiter operably associated with the tilt-mechanism to restrict the tilting of the vehicle body to less than the first tilt range, and releasable to allow the tilting through the first tilt range. Preferably, such a support assembly is incorporated in a vehicle, the vehicle also including a vehicle body in supported association with the tilt-mechanism for tilting laterally, a plurality of batteries housed within the vehicle body, and an electric motor powered by the batteries and configured to propel the vehicle body.

The present invention is also directed to a vehicle that includes a vehicle body having a longitudinal axis and being configured for supporting a rider, first and second tilting wheels disposed respectively at different lateral positions with respect to the longitudinal axis, a tilt-mechanism supportively associating the vehicle body from the tilting wheels to enable the vehicle body to tilt through a first tilt range with respect to a surface on which the tilting wheels are disposed, and a tilt-limiter operably associated with the tilt-mechanism to restrict the tilting of the vehicle body to less than the first tilt range, and releasable to allow the tilting through the first tilt range.

The tilt-limiter is preferably operable to lock the tilt-mechanism to fix the vehicle body in a locked tilt position. Preferably, the first tilt range is between about 20° and 80° wide. The tilt-limiter is also preferably operable to restrict said tilting to within a second tilt range that is smaller than the first tilt range. Preferably, the second range is between about 1° and 60° wide.

In one embodiment, the tilt-limiter is manually operable to restrict the tilting of the vehicle body. In alternate embodiments, the tilt-limiter is automatically operable. In some embodiments, for example, the vehicle further includes a sensor configured to sense a parameter related to the movement of the vehicle, and a tilt-limiter controller configured to operate the tilt-limiter to restrict or release the tilting of the vehicle body based on a value of the sensed parameter. Preferably, the sensor includes a speed sensor configured to sense the speed of the vehicle, the tilt-limiter controller being configured to operate the tilt-limiter to restrict the tilting of the vehicle body when the sensed speed drops below a predetermined speed threshold.

The tilt-limiter preferably includes a tilt adjusting mechanism configured to adjust the tilt of the vehicle body with respect to the vertical when the tilt-limiter is engaged to restrict the tilting of the vehicle body. Preferably, the vehicle further includes an inclination sensor configured to sense the inclination of the vehicle with respect to the vertical at least when the vehicle is at rest, and the tilt adjusting mechanism is configured to reposition the tilt-mechanism to adjust the of the vehicle body to a predetermined inclination.

The tilt-mechanism is preferably configured to allow the tilting wheels to move vertically with respect to each other. Preferably, the tilting wheels are disposed on opposite lateral sides of the vehicle body, and the tilt-mechanism allows the each of the first and second tilting wheels to concurrently move vertically in opposite directions from each other with respect to the vehicle body. More preferably, the tilt-mechanism includes a linkage to prevent or reduce tilting of the tilting wheels with respect to the vehicle body during the vertical movement in opposite directions.

In one embodiment, the tilting wheels are front wheels of the vehicle, and the vehicle further includes at least one rear wheel in supportive association with the vehicle body. In another embodiment, the tilting wheels are rear wheels of the vehicle, and the vehicle further includes at least one front wheel in supportive association with the vehicle body.

The vehicle can also include third and fourth tilting wheels disposed respectively at different lateral positions with respect to the longitudinal axis and being in supportive association to allow the vehicle body to tilt with respect to the surface. The vehicle preferably includes another tilt-mechanism supportively associating the vehicle body and third and fourth tilting wheels to enable the vehicle body to tilt with respect to the surface on which the tilting wheels are disposed. Preferably, the vehicle further includes another tilt-limiter operably associated with the other tilt-mechanism to restrict the tilting of the vehicle body, and releasable to allow the tilting through the first tilt range.

The vehicle preferably includes a steering mechanism to enable the rider to steer the first and second wheels for steering the vehicle. The vehicle also preferably includes a suspension system associated with the first and second wheels for absorbing shocks between the first and second wheels and the vehicle body. Preferably, the suspension system is configured to allow the first and second wheels to move vertically in a same direction with respect to the vehicle body.

The tilt-adjusting mechanism can be operatively associated with the tilt limiter to move the tilt-limiter with respect to the vehicle body, such that when the tilt limiter is engaged to restrict the tilting, the tilt adjusting mechanism moves left and right linkages of the tilt via the tilt-limiter to adjust the vehicle tilt. The linkages can each include an arm that is pivotally about a substantially longitudinal axis, with the tilt-limiter pivotally mounted about the axis and configured for releasable engagement with the arms.

The present invention thus provides a vehicle that includes a vehicle support assembly to can preferably be engaged when the vehicle decelerates to or below relatively slow speeds, or when the scooter is stopped, to prevent undesired or unnecessary tilting of the vehicle and loss of balance by the rider. The assembly can also preferably be disengaged to allow the desired tilting of the vehicle at relatively high speeds to enable advantageous steering and turning effects as the vehicle takes or turns in curves.

BRIEF DESCRIPTION OF THE DRAWINGS

FIGS. 11a-b are side and top schematic views, respectively, of a vehicle frame thereof;

DETAILED DESCRIPTION OF THE PREFERRED EMBODIMENTS

Figure 1A:
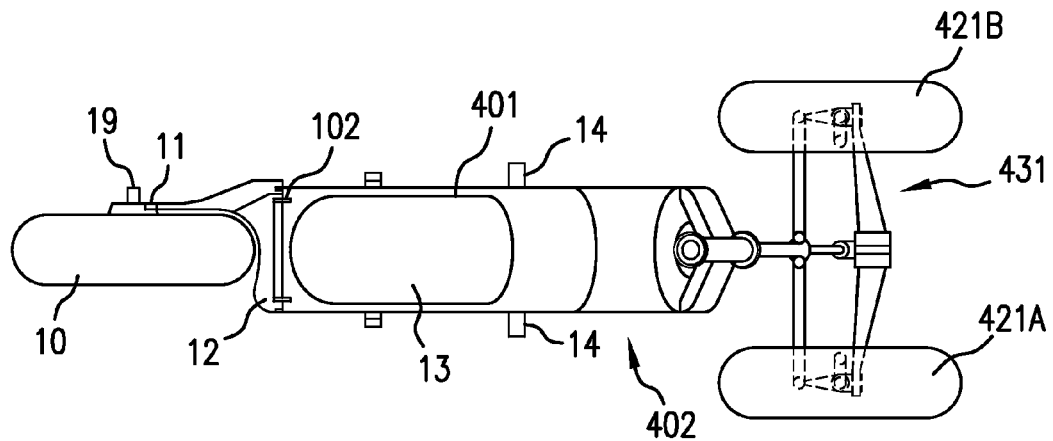
FIGS. 1a-c are top, schematic views of embodiments of the present invention having various arrangements of tilting.

The preferred electric- and hybrid-powered components and systems used in the embodiments of the vehicles of the present invention can be incorporated in vehicles having multiple wheels, for example, those having two, three, four, or more wheels. The preferred vehicle has three wheels, for example, with two front steering wheels 421A, 421B and one rear drive wheel 10 as shown in FIG. 1a. The vehicle of FIG. 1a also has a vehicle body 402 that includes a frame 401, such as described in U.S. Pat. No. 6,047,786, the content of which is expressly incorporated herein by reference thereto. A tilt-mechanism 431, which attaches the two front steering wheels 421A, 421B to the frame 401, allows the frame and wheels to tilt laterally, and also allows the wheels move vertically while staying generally aligned with the frame. The vehicle body 402 also includes a seat 13 on which the rider sits, and foot pegs 14 on either side thereof. The rear drive wheel 10 is attached to the frame 401 by swing arm 12, which also houses a motor 11 adjacent the rear drive wheel 10.

Figure 1B:
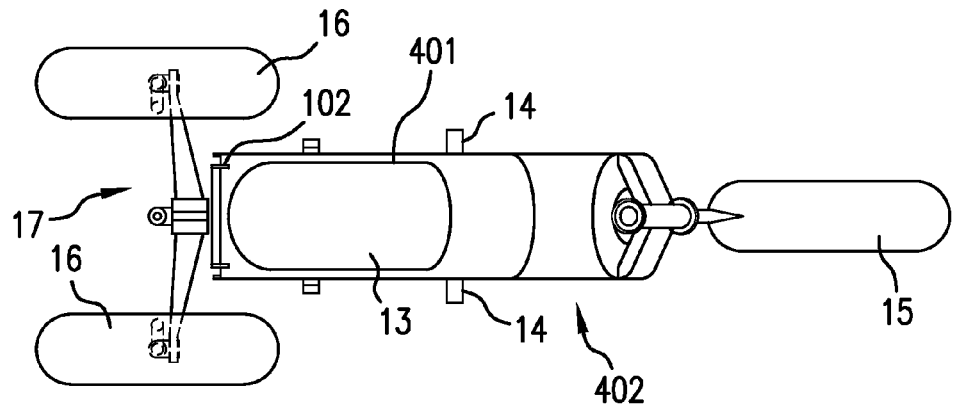
Figure 1C:
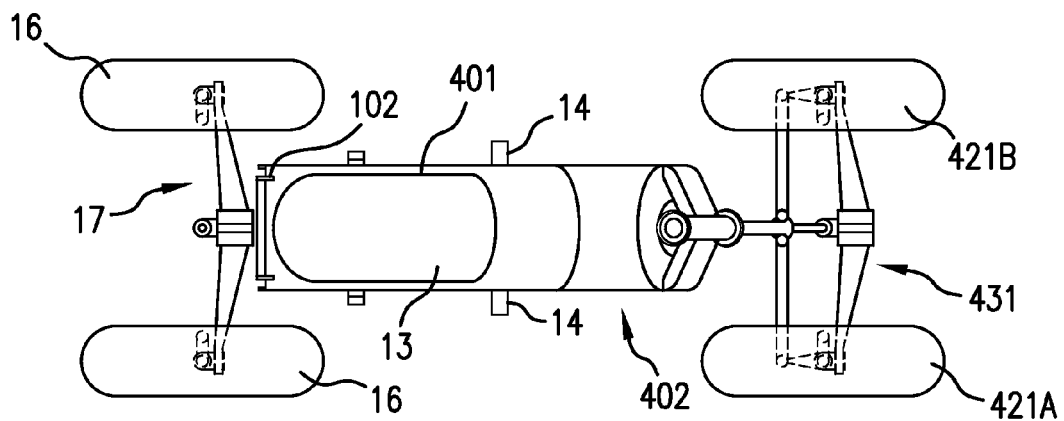
Figure 2:
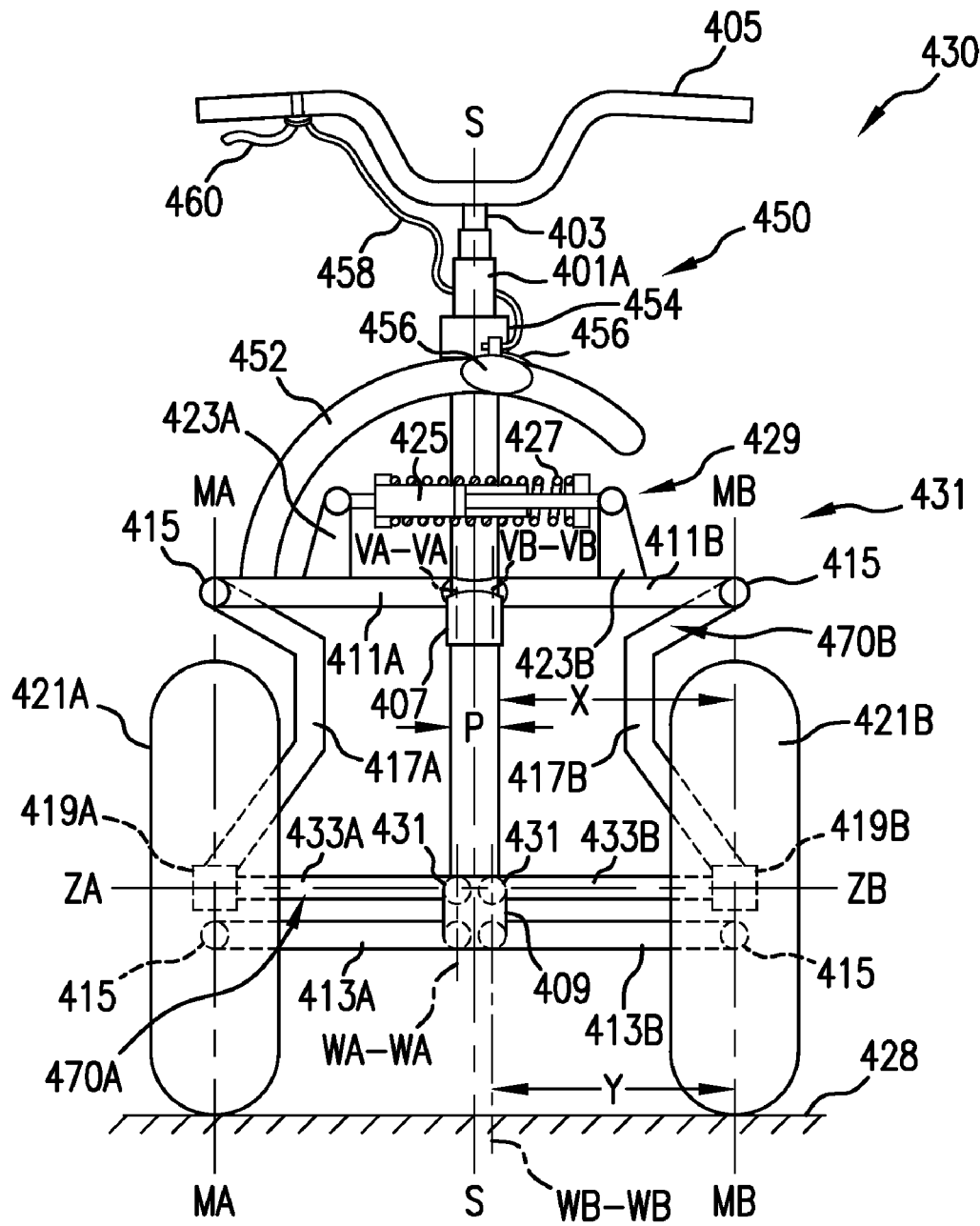
FIG. 2 is a front-view of a front steering wheel assembly of an embodiment of a scooter.
Figure 3:
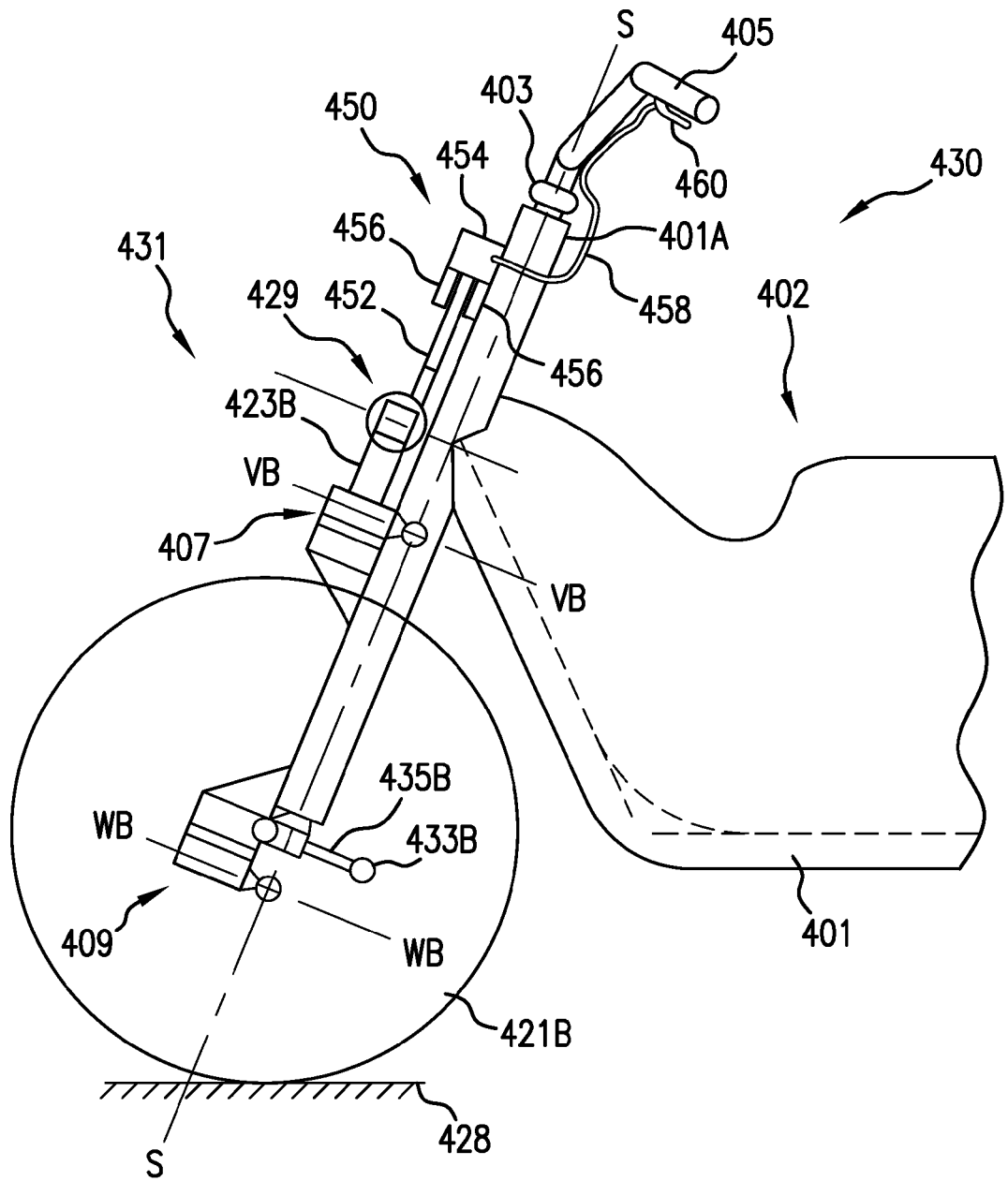
FIG. 3 is a side-view thereof.
Figure 4:
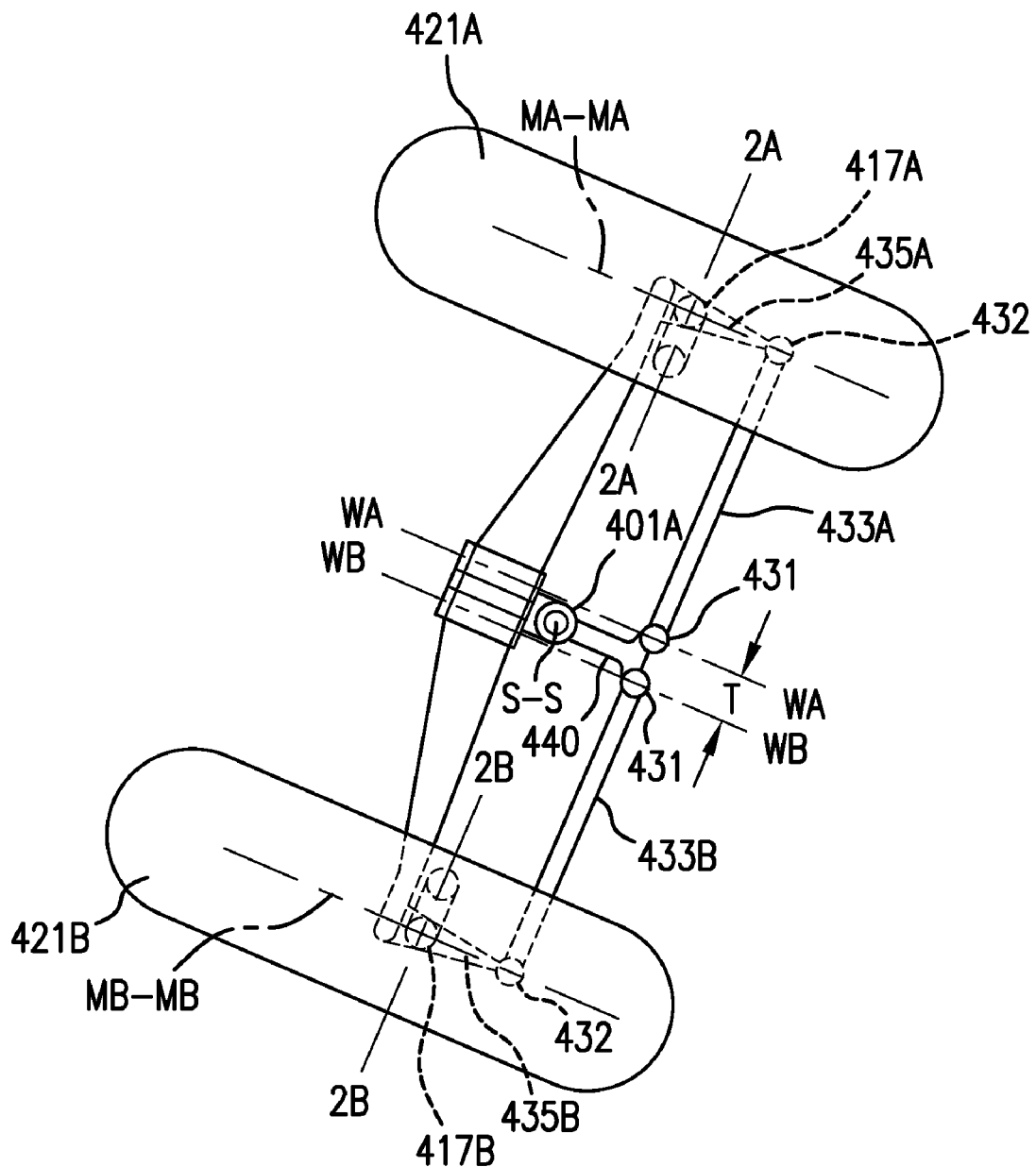
FIG. 4 is a bottom, schematic-view thereof.

Another embodiment of the vehicle of the present invention is shown in FIG. 1b, and has one front steering wheel 15 and two rear drive wheels 16. The rear wheels 16 are attached to the frame 401 by tilt-mechanism 17, which has similar features to the front tilt-mechanism 431. Preferably, the rear wheels 16 are not steerable, but they can be in some embodiments. In another embodiment, the vehicle has four wheels, for example, with two front steering wheels 421A, 421B attached to the frame 401 by tilt-mechanism 431, and two rear drive wheels 16 attached to the frame 401 by tilt-mechanism 17, as shown in FIG. 1c. Other numbered features of the vehicles of FIGS. 1b and 1c are similar in function to those described for the vehicle of FIG. 1a. Preferably, the vehicles of FIGS. 1a-c are configured as scooters, with the rider sitting on the seat 13 on top of a vehicle body 402 that is supported by the wheels. Determination of the number of wheels preferably depends on the use, driving capabilities, and style of the vehicle that is desired.

A preferred embodiment of the tilt-mechanism 431 of FIG. 1a is shown in FIGS. 2-7. The vehicle is preferably an electric scooter 430 that includes three wheels, with two front steering wheels 421A, 421B disposed on opposite lateral positions with respect to the longitudinal axis of the scooter 430, and a single rear drive wheel 10. Preferably, the electric scooter 430 includes the electric- and/or hybrid-powered components and systems. The scooter 430 preferably includes a frame 401, which preferably includes at the front a steering tube 401A, in which a steering column 403 is rotatably received. One end of the steering column 403 is preferably fitted with a handlebar 405. The steering axis S-S of the steering tube 401A preferably lies in the longitudinal plane of the scooter 430.

The tilt-mechanism 431 of the scooter 430 is preferably associated with the two front steering wheels 421A, 421B. The tilt-mechanism 431, which preferably includes viscoelastic suspension system 429, is provided for connecting wheels 421A, 421B to the frame 401 of the scooter. In a preferred embodiment, the tilt-mechanism 431 enables the vehicle body 402 and frame 401, the steering axis S-S, and the front wheels 421A, 421B of the scooter 430 to tilt laterally to either side with respect to the road or surface 428 as the scooter 430 is steered about a curve. In another embodiment, the tilt-mechanism 431 enables the vehicle body 402 or frame 401 and steering axis S-S of the scooter 430 to tilt laterally while maintaining the wheels 421A, 421B disposed in a substantially vertical orientation with respect to the surface 428 as the scooter 430 is steered about a curve. Advantageously, roadholding of the vehicle 430 in curves is improved using such a tilt-mechanism 431. The tilt-mechanism 431 also advantageously makes it possible for each of the wheels 421A, 421B to independently or simultaneously move vertically, and preferably in opposite directions from each other, with respect to the frame 401 of the scooter 430.

The tilt-mechanism 431 preferably includes an upper bracket 407 and a lower bracket 409 that are affixed, such as by welding, to the steering tube 401A, each bracket 407, 409 provided with hinges for respective pairs of upper suspension arms 411A, 411B and lower suspension arms 413A, 413B.

The suspension arms 411A, 411B and 413A, 413B can alternatively be hinged on the frame in another manner instead of by the brackets 407 and 409. The linking of the viscoelastic suspension 429 to two opposite suspension arms, for example, to the two upper suspension arms 411A, 411B or to the two lower suspension arms 413A, 413B, enables a single suspension system, comprising for example a spring/shock absorber assembly, to provide for the elastic suspension of both front steering wheels, and prevents or substantially reduces the tilting of the wheels 421A, 421B with respect to the vehicle body 402 or frame 401 during vertical movement of the wheels. In an alternative embodiment, an independent suspension system can be provided, such as with shock absorbers and/or springs attached to each wheel and to the axle or suspension arm connecting the wheels.

The suspension arms 411A, 411B and 413A, 413B of each of said pairs are preferably disposed symmetrically on opposite sides relative to the longitudinal axis or plane of the scooter 430. The pivot axes VA-VA, VB-VB and WA-WA, WB-WB of the various arms are preferably longitudinally aligned when the steering wheels 421A, 421B are straight, although variations in this orientation can be used. The pivot axes VA-VA, VB-VB and WA-WA, WB-WB are also preferably perpendicular to the steering axes ZA-ZA, ZB-ZB of the wheels 421A, 421B, although variations of this alignment can be used. Each upper suspension arm 411A, 411B and lower suspension arm 413A, 413B is articulated at the opposite ends from the pivot axes VA-VA, VB-VB and WA-WA, WB-WB, for example, by respective ball joints 415 on corresponding upper and lower ends of respective uprights 417A, 417B, although alternative suitable joints can be used. In this manner, each pair of arms, upper 411A, 411B and lower 413A, 413B, forms, with the respective upright 417A, 417B and the steering tube 401A, an articulated linkage 470A,470B, such as a four-bar linkage with arms 411A, 417A, 413A and 411B, 417B, 413B, respectively.

The axes VA-VA, VB-VB and WA-WA, WB-WB are preferably orthogonal to the axes MA-MA and MB-MB, which join the upper and lower ball joints 415 of each upright 417A, 417B. The ball joint 415 of each upper arm 411A, 411B is preferably set apart from the pivot axes VA-VA, VB-VB of said arm by a distance X that is equal and parallel to the analogous distance Y of the corresponding lower arm 413A, 413B. Pivoted on each upright, for example, by a conventional bearing/axle assembly 419A, 419B, is respective front wheels 421A, 421B to revolve about a respective horizontal axis ZA-ZA, ZB-ZB.

Furthermore, each of the axes MA-MA, MB-MB that passes through the upper and lower ball joints 415 of the respective uprights 417A, 417B of each steering wheel 421A, 421B and defines the steering axis of each wheel 421A, 421B is preferably contained in the median/longitudinal-vertical plane of the wheel 421A, 421B and, in the example shown, is parallel to the axis S-S of the steering column 403. In an alternative embodiment, axes MA-MA, MB-MB can be remote from the median plane of the wheels 421A, 421B. The relative tilt or inclination with respect to the vertical of the axes of the wheels MA-MA and MB-MB is not necessarily equal to the tilt with respect to the vertical of the steering axis S-S, and is determined on the basis of considerations known to the person skilled in the art in order to obtain an appropriate compromise between stability and maneuverability of the scooter 430. Preferably, the allowable lateral tilt of the axes of the wheels and the steering is at least about 20° from vertical, more preferably at least about 30° from vertical, and is at most about 80° from vertical, more preferably at most about 70° from vertical. Preferably, the range of allowable lateral tilt is centered when the vehicle body 402 or frame 401 is substantially vertical and the scooter 430 is on a substantially flat surface 428, with each wheel 421A, 421B at the same vertical height with respect to each other.

In the embodiment shown in FIGS. 2-7, the upper suspension arms 411A, 411B preferably include respective shock-absorber mount extensions 423A, 423B, which are preferably symmetrically relative to the longitudinal axis of the scooter 430 and extend upwardly. Articulated on the ends of said extensions 423A, 423B are respective ends of suspension device 429, for example fluid shock absorber 425 and spring 427, which tends to move the extensions 423A, 423B closer and apart upon compression and decompression thereof.

Figure 5:
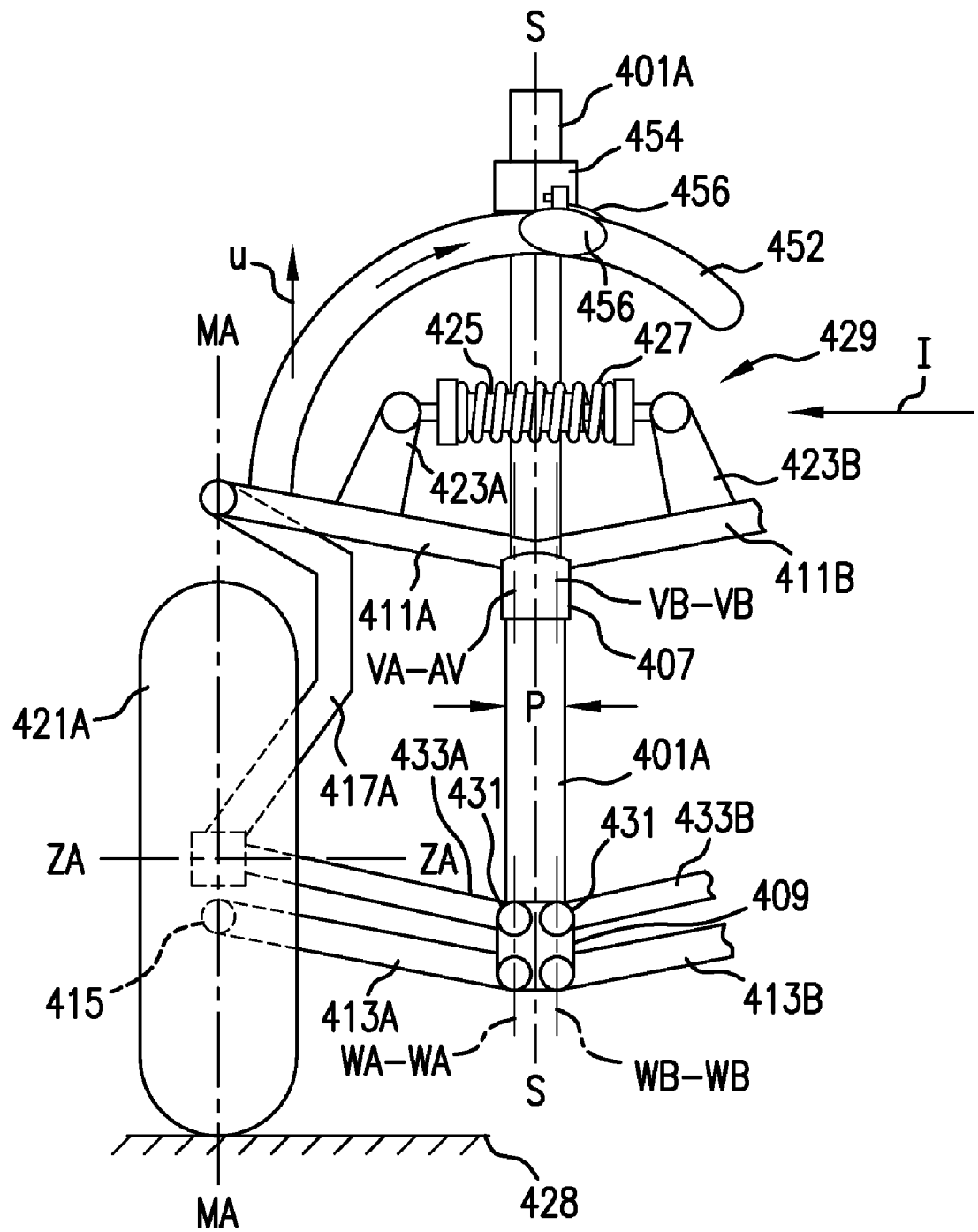
FIG. 5 is a front-view thereof, with the front portion of the scooter in a lower suspension position.
Figure 6:
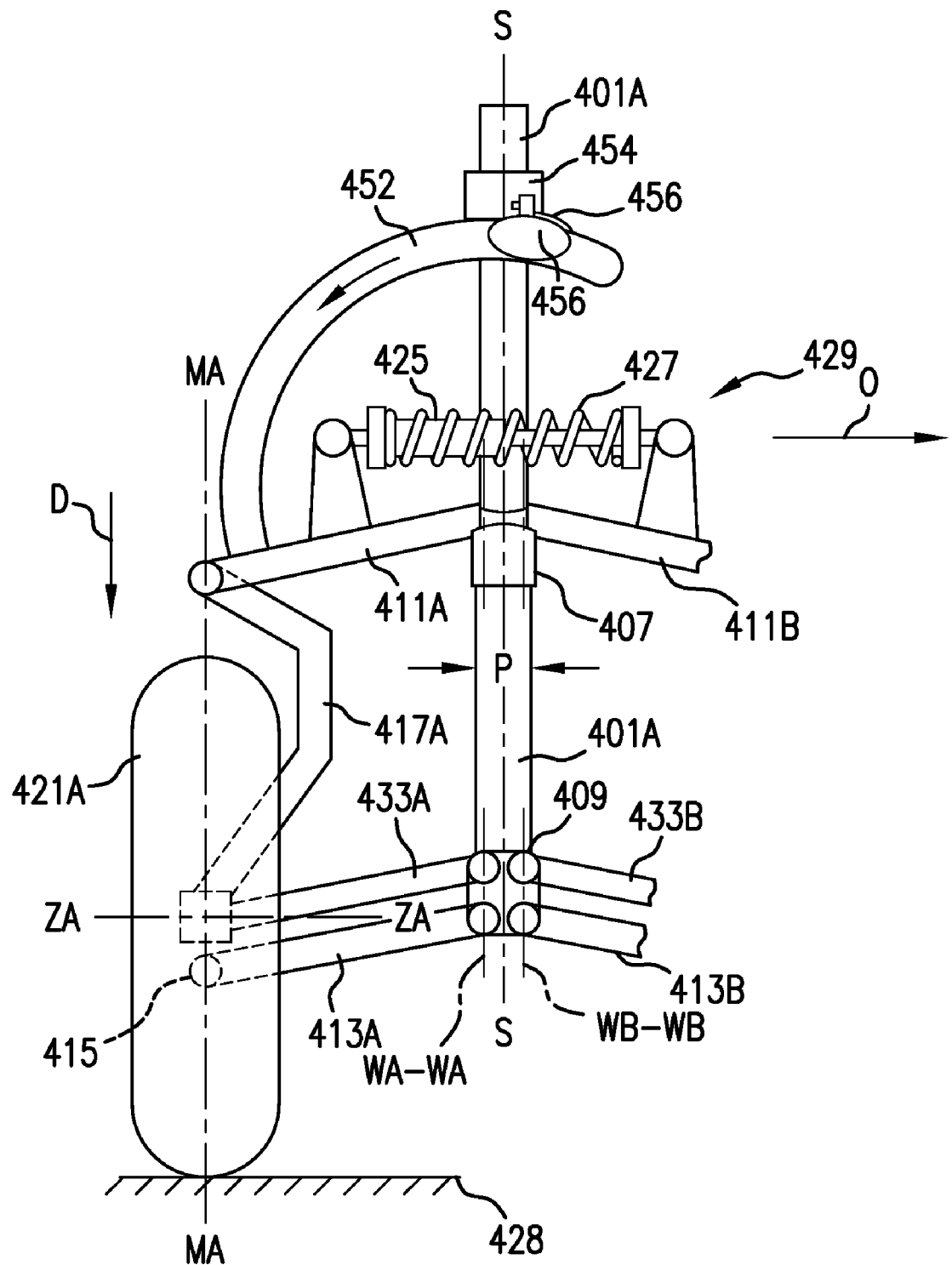
FIG. 6 is a front-view thereof, with the front portion of the scooter in an upper suspension position.

The elastic suspension of the suspension device 429 permits movement, preferably simultaneously, of the wheels 421a, 421B of the scooter 430 in the same vertical direction with respect to each other between an upper end position, as shown in FIG. 5, and a lower end position, as shown in FIG. 6. For example, in the upper end position, the upper suspension arms 411A, 411B and lower suspension arms 413A, 413B pivot respectively in the upward direction U about pivot axes VA-VA, VB-VB and WA-WA, WB-WB, thus allowing the wheels 421A, 421B to move in the upward direction U, and causing extensions 423A, 423B to move inward relative to each other in the direction I, compressing the fluid shock absorber 425 and spring 427 relative to each other. Similarly, in the lower end position, the upper suspension arms 411A, 411B and lower suspension arms 413A, 413B pivot respectively in the downward direction D about pivot axes VA-VA, VB-VB and WA-WA, WB-WB, thus allowing the wheels 421A, 421B to move in the downward direction U, and causing extensions 423A, 423B to move outward relative to each other in the direction O, decompressing the fluid shock absorber 425 and spring 427 relative to each other. Such a configuration prevents the irregularities of the road from transmitting bumps and vibrations to the rider via the steering control (for example, through the handlebar 405 attached to the steering column 403), the bumps and vibrations instead being absorbed by the suspension device 429 of the scooter 430. This makes riding on the scooter 430 particularly easy and pleasant. In alternative embodiments, the suspension device can be attached to other parts of the tilt-mechanism, frame, and wheel assemblies, or in different variations to provide shock absorption for the scooter.

Preferably fixed to the lower end of the steering column 403 is a steering link rod 427 that is preferably oriented parallel to the median plane of the front wheels 421A, 421B, but which can alternatively be oriented in another functional position, and linked thereto by joints 431, which are preferably ball or universal joints, and connecting rods 433A, 433B, which are in turn connected via ball, universal, or other suitable joints 432 to the ends of respective lateral link rods 435A, 435B. Each lateral link rod 435A, 435B is preferably solidly fixed to the respective uprights 417A, 417B of the tilt-mechanism 431, and the center of the ball joint 432 of each lateral link rod 435A, 435B preferably lies in the median plane of the respective wheel 421A, 421B, but can alternatively be displaced therefrom in some embodiments.

The joints 431 of the steering link rod 427 are preferably disposed symmetrically at the side of the axis of the link rod 427 and their centers are set apart by a distance T so as to differentiate, when the scooter takes or turns in curves, the steering angle of the relative outer wheel from that of the inner wheel to obtain correct steering. This arrangement makes it possible to obtain correct steering while keeping the joints 432 on the center line of the wheels. The distance T is advantageously equal to the center distance between the axes VA- VA and VB-VB, and the center distance between the axes WA-WA and WB-WB. In this manner, correct steering behavior in curves is obtained.

Each connecting rod 433A, 433B preferably has a length such that its projection onto a plane orthogonal to the pivot axes of the suspension arms 411A, 411B, and 413A, 413B has a length equal to the characteristic distances X and Y of the arms. In this manner, the joltings permitted by the suspension device 429 do not change the position of each wheel 421A, 421B defined by the rotation of the handlebar 405, preventing disruption to the steering and minimizing tire wear.

Figure 7:
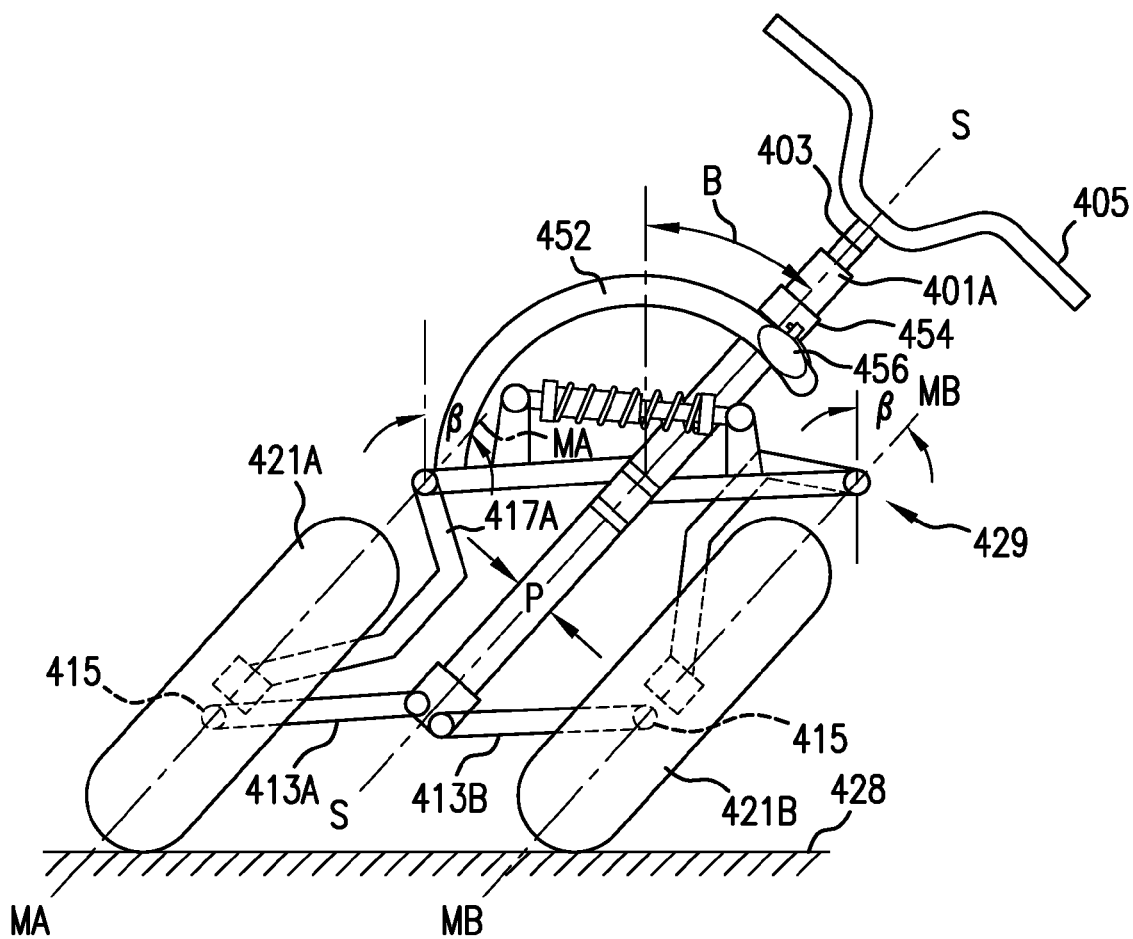
FIG. 7 is a front-view thereof, tilted with respect to the vertical.

As shown in FIG. 7, the tilt-mechanism 431 described herein permits lateral tilting of the scooter 430, for example through an angle β, advantageously to offset the centrifugal force when cornering the scooter 430. Advantageously, in embodiments where both the frame and wheels laterally tilt with respect to the vertical during curves, the resultant force exerted on the rider and vehicle body is kept generally centered between the wheels, thus retaining stability of the vehicle as it turns around a curve. In the embodiment of FIG. 7, the wheels substantially tilt along with the frame 401, preferably remaining substantially aligned with the frame since they tilt to substantially the same inclination with respect to the vertical as the frame. In the embodiment shown, the pivot axes VA-VA, VB-VB of the upper arms 411A, 411B are set apart from one another by a distance P, but it is alternatively possible for the two pivot axes VA-VA, VB-VB to coincide, without preventing independent movement of the two suspension arms 411A, 411B.

In other embodiments, the upper arms can be rigidly connected to one another so as to form a cross-piece articulated in the central region about a pivot of axis on the steering sleeve. Furthermore, respective fluid shock absorbers, having respective compression springs to form MacPherson-type elastic suspensions, for example, can be interposed between the upper part of the respective uprights and the ball joints of the respective upper arms. The steering linkage is preferably analogous to that described in the previous embodiment, but the distances X and Y of the upper and lower arms are preferably not identical.

In preferred embodiments, the tilt-mechanism 431 also includes tilt-limiter operably associated therewith to restrict and permit the lateral tilting of the vehicle 430 with respect to the surface 428. As shown in the embodiment of FIGS. 2-7, a preferred tilt-limiter 450 includes a tilt-limiter member 452 that is attached, and preferably fixedly coupled, to one of the upper suspension arms 411A, 411B. In other embodiments, another tilt-limiter member can be attached to the other suspension arm. The tilt-limiter member 452 preferably has a curved shape and extends toward the handle bar 405 and the steering tube 401A for association with a braking member 454, which is preferably disposed on the steering tube 401A or mounted to another part of the frame. The braking member 454 can be disposed on the front, rear, or either lateral side of the steering tube 401A, above or below the suspension arms 411A, 411B. As shown in FIGS. 2-7, the braking member 454 is disposed on the front of the steering tube 401A. Preferably, the braking member 454 includes a brake caliper 456 configured to receive the tilt-limiter member 452 therebetween to clamp brake pads onto the front and rear sides of the tilt-limiter member 452.

An actuator 460 is preferably associated with the braking member 454, such as by a cable 458. Preferably, the actuator 460 is disposed on or near the handle bar 405 for easy manipulation by the rider, although the actuator can be positioned on the vehicle body 402 or frame 401, or at another desired location, of the scooter 430. The actuator 460 is preferably configured for adjusting the braking member 454 between the engaged and disengaged positions. When adjusted to the engaged position, the brake pads of the caliper 456 grips the front and rear side of the tilt-limiter member 452 to lock or prevent movement of the tilt-limiter member 452 relative to the braking member 454, steering tube 401A, and frame 401. Because the tilt-limiter member 452 is attached to one of the upper suspension arms, and as shown in FIGS. 2-7 to the upper suspension arm 411A, that upper suspension arm is locked in position relative to the steering tube 401A and frame 401 and is prevented from pivoting about pivot axis VA-VA, while the other suspension arm 411B is maintained in position by the suspension device 429. As a result, the frame 401, or the wheels 421A, 421B and the frame, are substantially prevented from tilting laterally, and the wheels are prevented from moving in the upward direction U or downward direction D. In embodiments where two tilt-limiter members are attached to both sides of the four-bar linkage of the tilt-mechanism, both suspension arms can be fixed at a desired angle. Alternatively, the upper suspension arms can be selectively fixed with each other, such as by locking out the suspension device 429, and thus engaging the braking member 454 with the tilt-limiter member 452 that is attached to only one of the upper suspension arms results in fixing both sides at a desired angle.

Conversely, when the braking member 454 is moved to the disengaged position, the caliper 456 is disengaged from the tilt-limiter member 452, and the tilt-limiter member 452 is free to move relative to the braking member 454, the steering tube 401A, and the frame 401. With the braking member 454 in the disengaged position, the tilt-limiter member 452 is able to move between the brake pads of the caliper 456. The upper suspension arms 411A, 411B can thus move in the upward direction U, as shown in FIG. 5, and in the downward direction D, as shown in FIG. 6, as the suspension arms pivot about pivot axes VA-VA, VB-VB. Additionally, the wheels 421A, 421B, as well as the steering tube 401A and the frame 401, can also tilt laterally with respect to the vertical and the surface 428 when the braking member 454 is in the disengaged position, as shown in FIG. 7.

The actuator can allow manual or automatic control or adjustment of the braking member 454 or other tilt-limiter portion to select between the engaged and disengaged positions. A preferred manual actuator can include a lever mechanism 460 that, upon actuation, applies tension to a cable 458 associated with the braking member 454, which in turn causes the brake pads of the caliper 456 of the braking member 454 to grip the tilt-limiter member 452. The actuator 460 is preferably configured to retain the braking member 454 in the engaged position, such as by using a ratchet or other suitable mechanism, so that the rider does not need to hold the actuator 460 in the engaged position. When the lever mechanism is again operated to release the braking member 454, the tension is withdrawn and the caliper 456 releases the tilt-limiter member 452.

In an alternative embodiment, the actuator automatically adjusts and retains the tilt-limiter between the engaged and disengages positions, and can do so using, for example, electromechanical, hydraulic, or pneumatic systems. In one embodiment, the actuator can be configured as a separate mechanism, for example a button member. Activation of such mechanism by the rider causes an electrical signal to be sent to a controller, preferably controller 102 as shown in FIG. 1a, which operates the tilt-limiter to adjust to, and be retained in, the engaged position. Subsequent activation of the mechanism sends another signal to the controller 102 to release the tilt-limiter and adjust it back to the disengaged position. Other embodiments may include both manually and automatically adjustable actuators for the tilt-limiter, for example, with the manual actuator having override capabilities over the automatic actuator.

In other embodiments, the tilt-limiter includes a sensor configured to sense a parameter related to the movement of the vehicle, the sensor configured to then send a signal to a controller configured to operate the tilt-limiter to restrict or permit tilting of the vehicle based on the value of the sensed parameter. For example, the vehicle can include a speed sensor, for example speed sensor 19 located adjacent rear wheel 10 in FIG. 1a, that is configured to measure the speed at which the vehicle is moving, such as by measuring the rotational speed of the rear wheel. At high speeds, it is preferred that the tilt-limiter remain in the disengaged position to allow the frame, or the wheels and frame, to tilt laterally relative to the vertical and surface/road, and allow the wheels to freely move in the vertical direction with respect to the frame, so as to enable the advantageous steering and driving benefits of the tilt mechanism as the scooter takes curves or moves over bumps in the road. When the vehicle decelerates below a preselected deceleration threshold speed, for example at less than about 5 mph, from such high speeds to relatively low speeds or stand still, the speed sensor preferably sends a signal to the controller identifying that the deceleration threshold has been passed, and the controller automatically positions the tilt-limiter in the engaged position to prevent or restrict undesired tilting of the frame, or wheels and frame, and loss of balance by the rider. Preferably, the deceleration threshold speed that triggers automatic actuation of the tilt-limiter to the engaged position is less than about 10 mph, and more preferably less than about 5 mph, and most preferably less than about 4 mph, and is preferably more than about 0.5 mph, and more preferably more than about 2 mph. A preferred deceleration threshold speed is about 3 mph.

Upon acceleration from stand still or other relatively lower speeds to higher speeds past an acceleration threshold speed, for example of about 3 or 4 mph, the speed sensor preferably signals the controller that such an acceleration speed has been passed, and the controller adjusts the tilt-limiter to the disengaged position. Preferably, the acceleration threshold speed for automatic actuation of the tilt-limiter to the disengaged position is at least about 2 mph, and preferably less than about 10 mph, and more preferably less than about 5 mph. Preferably, the acceleration threshold speed is less than the deceleration threshold speed, but in one embodiment, they are equal.

In some embodiments, the controller automatically actuates the tilt-limiter to the disengaged position upon movement of the vehicle in the forward direction, actuation of the throttle by the rider, or placement of the rider's feet upon foot pegs 14 as shown in FIG. 1a. In other embodiments, the speed sensor can send a signal directly to the tilt-limiter when the vehicle passes below a deceleration threshold speed or above an acceleration threshold speed, thus triggering automatic adjustment of the tilt-limiter to the engaged or disengaged position.

Figure 8:
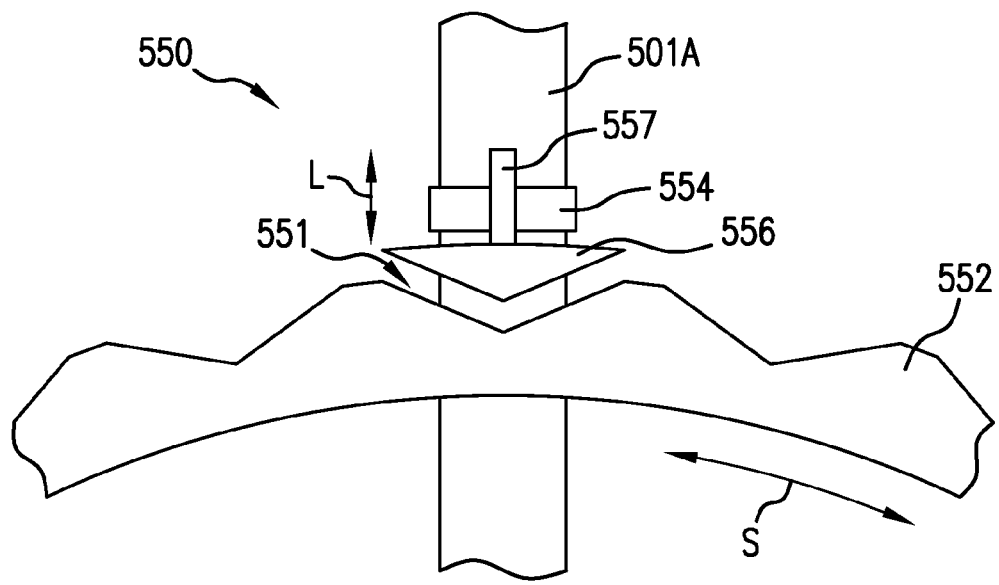
FIG. 8 is a front-view of an embodiment of a centering tilt-mechanism.

FIG. 8 shows one embodiment of a self-centering tilt-limiter 550 that includes a first engagement member 552 and a second engagement member 554 disposed on the front of steering tube 501A. The second engagement member 554 preferably includes a centering wedge 556 that is configured for receipt within one of a plurality of centering recesses 551 of the first engagement member 552. Preferably, the second engagement member 554 also includes an actuator 557 that is configured for moving the centering wedge 556 in the direction L toward and away from the centering recesses 551 of the first engagement member 552. In this configuration, the second engagement member 554 can be inserted to a range of selected depths into the desired recess 551 to obtain a partial or complete engagement therein. A partial engagement can allow restricted tilting of the vehicle body 402 and frame 401, limited to an angular range with respect to the vertical or road/surface. Such an angular range is preferably smaller than the total allowable lateral tilt of the frame and wheels when the tilt-limiter is disengaged. Preferably, the restricted angular range is at least about 1° wide, more preferably at least about 5° wide, and at most about 20° wide, for vehicles intended to be used on substantially flat surfaces. For vehicles that are intended to be used on more rough or inclined surfaces, the restricted angular range is preferably at least about 10° wide, and more preferably at least about 20° wide, and is preferably at most about 60° wide, more preferably at most about 50° wide.

To adjust the second engagement member 554 to only a partially engaged position, for example when a speed sensor determines that the vehicle is decelerating to near the deceleration threshold speed, such as at about 3 to 4 mph, the actuator 557 preferably moves the centering wedge 556 partially into one of the centering recesses 551 such that the first engagement member 552 has limited movement from side to side in the tilting direction S before the centering wedge 556 contacts a portion of a centering recess 551. This enables the wheels and frame of the scooter to tilt and move in either direction to a limited degree before movement is restricted by the braking member 554. Such a partial engagement can be retained when the vehicle is completely stopped.

In contrast, to adjust the second engagement member 554 to a completely engaged position, for example when the speed sensor determines that the vehicle is at stand still or has decelerated below a deceleration threshold speed, the actuator 557 preferably moves the centering wedge 556 fully into one of the centering recesses 551 such that the centering wedge is completed engaged therewith. As described above, such an engagement prevents the wheels and frame from tilting or moving with respect to each other.

Various other configurations of the self-centering wedge and recess can be employed in other embodiments, depending on the desired range of the adjusted positions. For example, the degree of engagement of the centering wedge, which governs the angular tilting allowed by the partial engagement, can alternatively be varied, such as in reverse proportion to the speed of the vehicle below a threshold. In one embodiment, the respective positions of the first and second engagement portions can be reversed, with the first engagement member including the actuator that is configured to move the first engagement portion toward the second engagement portion. In other embodiments, the self-centering wedge can be partially engaged within a centering recess, and then the tilt-limiter gradually reduces the amount of restricted lateral tilting allowed as the speed of the vehicle is reduced below the deceleration threshold speed, eventually moving the centering wedge to the completely engaged position within the centering recess to lock or prevent tilting of the wheels and frame when the vehicle is at stand still.

In another embodiment, the tilt-limiter includes an inclination sensor, for example a gyroscope, an inclinometer, or another suitable sensor, such as accelerometers associated with a processor. The inclination sensor is configured to sense the angle of inclination $\beta$ of the vehicle body or frame with respect to the vertical or the road/surface, at least when the vehicle is at stand still or moving at slow speeds. For example, at relatively slower speeds, the inclination sensor can sense when the wheels or frame are beginning to tilt to either side, which may indicate that the rider is losing balance of the scooter. In response, the tilt-limiter is preferably automatically adjusted to the engaged position to lock the wheels and frame with respect to each other and prevent lateral tilting of the vehicle. As explained above, tilting of the frame, or wheels and frame, is preferred at higher speeds, so the tilt-limiter would remain disengaged at these speeds irrespective of input by the inclination sensor.

Figure 9:
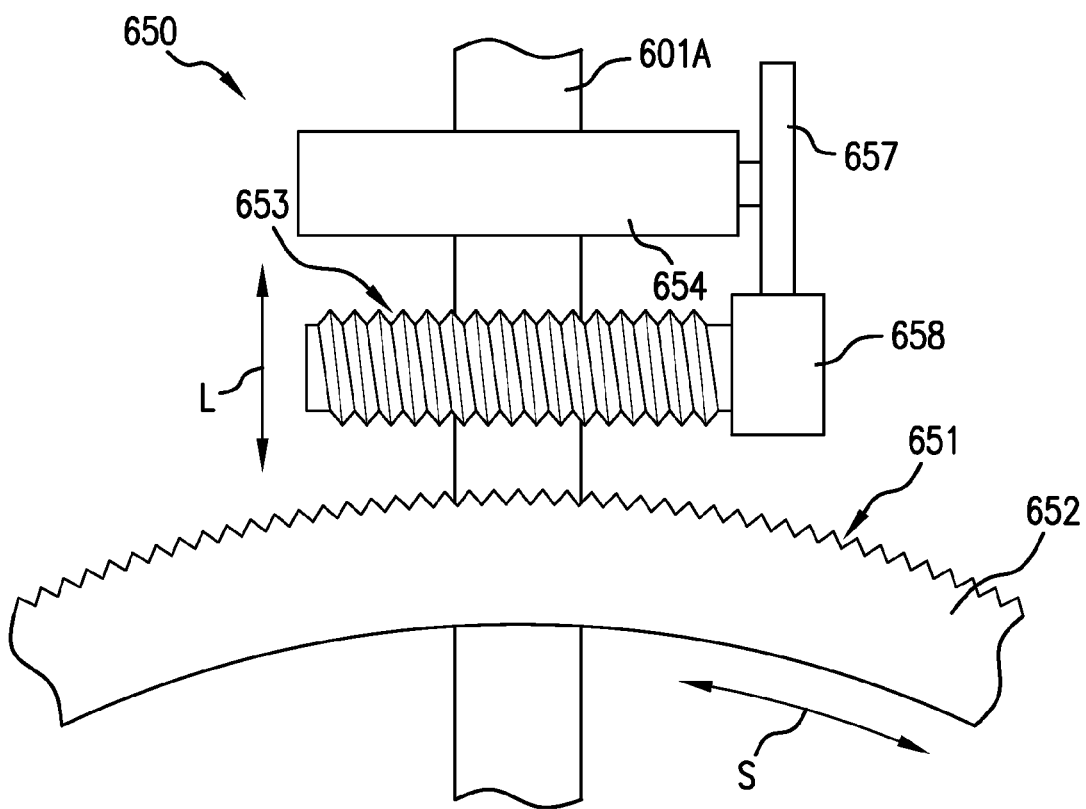
FIG. 9 is a front-view of an embodiment of a tilt-mechanism for controlling the inclination of the scooter body.

As shown in FIG. 9, the tilt-limiter 650 includes a tilt-limiter member 652, such as a geared rack, having teeth or threads 651 on a surface thereof, and an tilt adjusting mechanism 654 disposed on the front portion of the steering tube 601A. Preferably, the tilt adjusting mechanism 654 includes a threaded engagement portion 653, such as a worm gear, and a motor 658 for rotating the screw 653, both which are connected to an actuator 657. Actuator 657 is configured for moving the worm gear 653 and motor 658 in the direction L, into and out of engagement with the tilt-limiter member 652. Preferably, the tilt adjusting member 654 is moved to the engaged position when a speed sensor senses deceleration to less than a predetermined deceleration threshold speed. In the engaged position, the motor 658 can control the inclination of the vehicle body or frame with respect to the vertical degree by causing the tilt-limiter member 652 to move from side to side in the direction S, and thus control the amount of tilt of the frame and wheels. For example, the motor 658 can lock the rotation of the worm gear 653 to prevent lateral movement of the tilt-limiter member 652, and thus prevent lateral tilting of the frame and wheels. Alternatively, lateral tilting-play can be allowed by providing a tolerance between the worm gear 653 and the teeth of the rack 652.

Additionally, if an inclination sensor senses that the vehicle body or frame is laterally tilted, the motor 658 can rotate the worm gear 653 to reposition the tilt-limiter member 652, thus adjusting the inclination of the vehicle body to an upright, or other desired, orientation relative to the vertical. For example, if the vehicle is stopped on a slope that descends to the left, the left wheel will be lower than the right wheel, with the body tilted upright. If then the vehicle is turned to another orientation with respect to the sloping surface, the tilt-adjusting mechanism can control the tilt-mechanism to keep the vehicle body upright regardless of the slope.

While electromechanical systems have been described for the self-centering tilt-limiter 550 of FIG. 8, and the tilt-limiter 650 with tilt adjusting mechanism 654 of FIG. 9, such tilt-limiters can also incorporate pneumatic, hydraulic, or other suitable systems.

In the previous embodiments, the tilt-limiter or portions thereof are described as being attached or fixedly coupled to the steering tube and frame. Alternatively, the tilt-limiter or portions thereof can be moveable with respect to the steering tube and/or frame of the vehicle. This can be accomplished with a biasing member, for example a spring, that allows partial lateral movement of the tilt-limiter, which is restrictively biased toward a center position by the biasing member.

Figure 10:
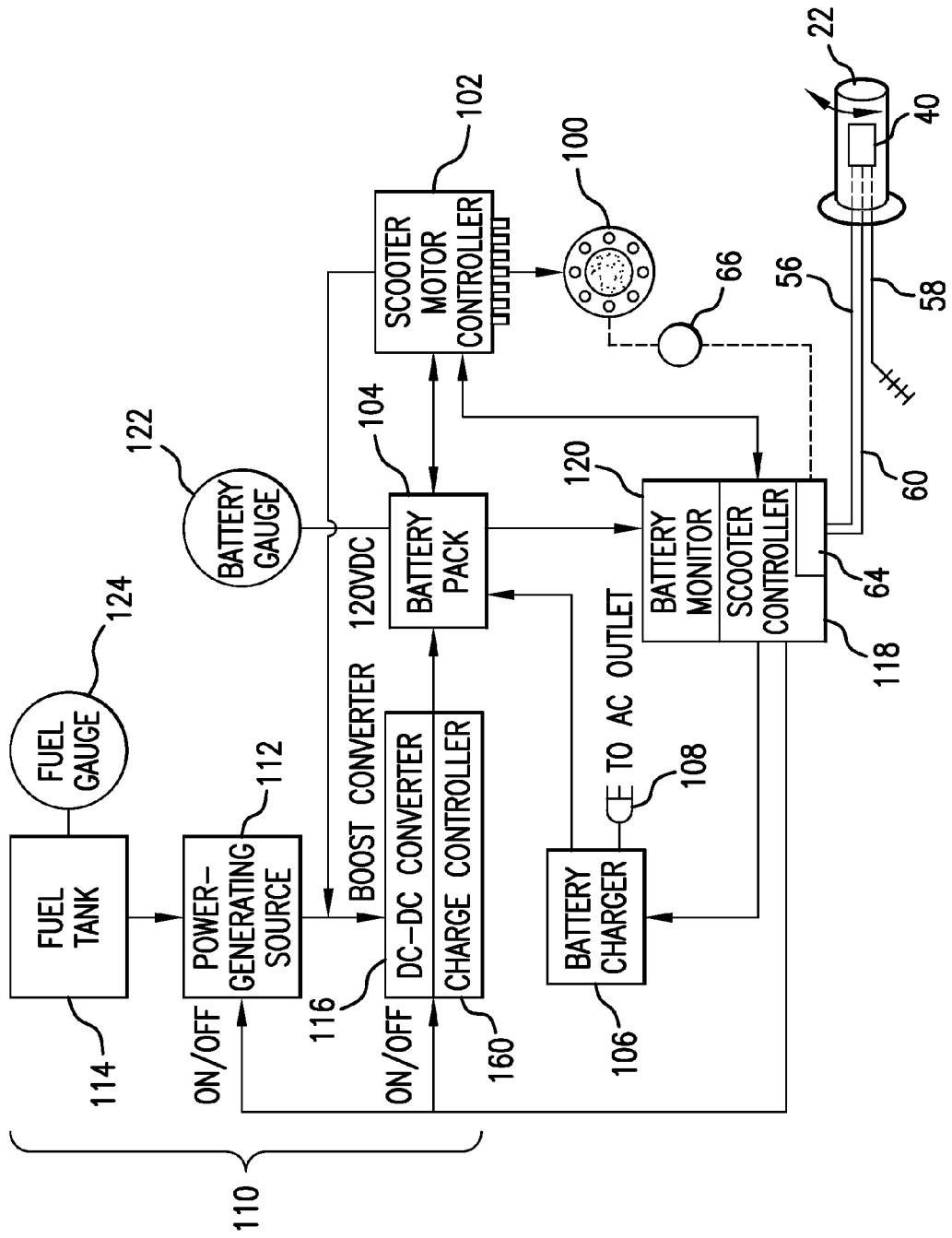
FIG. 10 is a block diagram showing components used to power an embodiment of a vehicle constructed according to the present invention.

FIG. 10 shows a block diagram illustrating functional components of a preferred embodiment of a vehicle. While the vehicle of the present invention can be powered by a variety of suitable power plants, such as internal combustion engines, a preferred embodiment is powered by an electric motor 100. The vehicle preferably has at least two wheels, and more preferably has three or four wheels. Alternative embodiments can have additional wheels on which the body of the vehicle is supported. Motor 100 can be a three-phase, slotted, brushless, permanent magnet motor, as described in U.S. Pat. No. 6,326,765, the content of which is expressly incorporated herein by reference thereto. Other embodiments can include motors with different specifications and configurations. In particular, motors having different numbers of poles, or having greater or lesser power and torque can be used.

In the preferred embodiment of a scooter, motor 100 receives a three-phase voltage from motor controller 102. The motor controller 102 has the battery DC voltage as its input and converts the battery voltage to a three-phase output to the motor 100. Preferably, motor controller 102 outputs a modulated signal, such as pulse width modulation, to drive the scooter motor 100. The motor controller 102 preferably includes high-power semiconductor switches which are gated (controlled) to selectively produce the waveform necessary to connect the battery pack 104 to the scooter motor 100.

A rider input device, including transducer 40, is preferably operably configured to translate a rider input from the throttle 22 into an electrical signal that is transmitted to a regenerative braking control module 64, including a microprocessor on the scooter controller 118. Preferably, the transducer 40 has three wires: a power lead 56, a ground 58, and a signal wire 60. The control module 64 further receives input signals from at least one process monitoring sensor 66. The process monitoring sensor 66 preferably provides instrumentation data such as drive wheel speed, front wheel speed, and vehicle accelerometer measurements.

The braking system can be configured to apply a regenerative braking torque to the drive wheel when the transducer signals a regenerative braking command and the process sensors signal a drive wheel velocity that is greater than zero. A preferred embodiment of regenerative braking system is described in U.S. Pat. No. 6,724,165, the content of which is expressly incorporated herein by reference thereto. Preferably, the braking torque increases with an increase in a signal from the transducer 40 as controlled by the rider. In essence, during the regenerative braking mode, the motor preferably acts as a generator supplying current to the battery, which loads down the generator and thereby causes a braking action.

Battery pack 104 preferably includes sufficient batteries connected in series to provide at least 100 VDC, although alternative embodiments can provide lesser voltages. The battery pack 104 can weight between 40 lbs and 350 lbs, and is a comprises a significant portion of the total vehicle weight. Thus, it may be difficult for a smaller and/or lighter rider to control or maintain stability of the vehicle due to its large overall weight. The battery pack 104 preferably includes nickel metal hydride (Ni-MH) batteries, for example, 30 amp-hour, 120 volt Ni-MH batteries, although other battery types, such as lead-acid batteries, Ni—Zn batteries, or lithium ion batteries, can also be used. Regardless of which types of batteries are used, the batteries of the present invention are preferably rechargeable. In one embodiment, a battery charger 106 is used to recharge battery pack 104. Battery charger 106 preferably resides on-board the scooter and is connectable to an AC outlet via a plug 108 or the like. Alternatively, the battery charger 106 can be separate from the scooter and is connected to the scooter only during, for example, high-current charging sessions.

In addition to the battery charger 106, which preferably connects to an AC outlet to recharge the battery pack 104, an on-board charging system 110 can also be incorporated on the scooter. The embodiment of FIG. 10 is a hybrid vehicle, which also includes an on-board charging system that preferably includes an on-board power generating source 112, a fuel supply or tank 114, which feeds the on-board power generating source 112, and a converter/charge controller 116, which transforms the output of the on-board power generating source 112 into a form suitable for charging the battery pack 104.

Scooter controller 118 preferably sends signals to the motor controller 102, the battery charger 106 (when provided on-board the scooter), the on-board power generating source 112, and the converter/charge controller 116. The charge of the battery pack 104 is monitored via a battery monitor 120, which in turn is connected to the scooter controller 118 to provide information which can affect the operation of the scooter controller 118. The energy state of the battery pack 104 is displayed on a battery gauge 122 so that the rider can monitor the condition of the battery pack 104, much like a fuel gauge is used on a gasoline powered scooter. The status of the fuel supply in the tank 114 is similarly displayed on a fuel gauge 124 for the rider's convenience. In an alternative hybrid-powered embodiment, the on-board power generating source 112 charges the batteries that power the motor, but no separate charger or charging circuit is provided.

A DC-DC converter 116 is preferably used to convert the output of the fuel cell 112 into a voltage suitable for charging the battery pack 104. The converter 116 preferably includes a number of step-up converters arranged in parallel to deliver the current required by the battery to sustain effective charging. The step-up converters preferably have an input voltage in this embodiment, which can be on the order of between about 28 and 40 VDC, and an output voltage, which can be on the order of between about 135 and 145 VDC at 0.5 amps, and preferably of about 140 VDC. Positive output terminals of each step-up converter are preferably passed through a diode to ensure that the battery bus voltage does not leak current back through the step-up converter in the event that the fuel cell is switched off. The output from the step-converters is connected to a current limiting resistor. In this manner, the DC-DC converter provides an output of, for example, about 138 volts at a maximum draw of about 2 amps at the output port.

The output port of the DC-DC converter 116 is preferably applied to a charge controller 160, such as described in U.S. Pat. No. 5,965,996, the content of which is herein expressly incorporated by references thereto. Charge controller 160 is capable of controlling power to a nominal 120 volt DC battery pack, which can be, for example, the battery pack 104. While several suitable charging schemes can be used, the charge controller 160 preferably charges a battery pack by first using a constant current until the battery pack reaches about 140 volts, then applying a constant voltage at about 140 volts, and then reapplying a constant current until the battery pack reaches about 156 volts. Each of these voltage set points can be specified and varied under the control of the scooter controller 118. In this respect, the scooter controller 118 enables the DC-DC converter 116 to continue to charge the battery pack 104 via the charge controller 160 until the battery becomes fully charged or the rider elects to shut down the system. In this manner, the charge controller 160 provides over-current and over-voltage limit protection. The charge controller 160 is preferably configured to minimize ripple current applied to the battery pack and is also configured to provide temperature compensation consistent with the variability of gassing voltage requirements. Battery gauge 122 is preferably provided to show the battery and charging status.

Referring to FIGS. 11a and 11b, a preferred embodiment of a scooter 130 has a scooter frame 132, such as disclosed in U.S. Pat. No. 6,047,786. The scooter 130 has two front wheels 421A, 421B that is connected to the frame by tilt-mechanism 431, as described above. The battery pack 104 is preferably arranged low in the frame 132 to provide a relatively low scooter center of gravity. While FIGS. 11a and 11b show the battery pack 104 to be a linear arrangement of batteries having substantially similar vertical positions, in other embodiments the batteries can be arranged in different configurations so as to optimize space in the scooter frame.

The on-board power generating source 112 in this embodiment is positioned just above the battery pack 104, with the fuel tank 114 positioned above on-board power generating source 112. Preferably, the fuel tank 114 is easily accessible from outside the scooter 130 to facilitate both refueling and replacement thereof The fuel tank 114 can alternatively be integrally provided with the on-board power generating source 112.

The scooter motor 100, along with its associated gear box, drives the rear wheel 134 of the scooter, and is preferably mounted to a swing arm 12 that is pivotally connected with the frame 132 to drive the rear wheel 134. Shock absorber 18 also connects the rear wheel 134 to the rear of the frame 132. The scooter motor controller 102 is preferably positioned on or in the interior of the frame 132, and preferably to minimize the distance between it and the motor 100. The battery charger 106 is preferably positioned close to the battery pack 104 and, therefore, at a relatively low position, and preferably to facilitate connection to an external power supply. The battery gauge 122 and the fuel supply gauge 124 are preferably positioned near the front of the scooter 130 to facilitate viewing by a rider while riding.

In a first preferred embodiment, the on-board power generating source 112 is a fuel cell, and the fuel supply 114 is either hydrogen or methanol, depending on the nature of the fuel cell 112. Such a system preferably operates on ambient air and clean pressurized hydrogen fuel from the fuel tank 114. This type of fuel cell includes a cell stack of a proton exchange membrane type (PEM), mechanical auxiliaries, and an electronic control module. A fuel cell such as this provides a relatively low power on-board power generating source, which operates at a continuous, steady state output. This provides a constant trickle charge to the battery pack 104 via the DC-DC converter/charge controller. The fuel cell 112 preferably normally works on a continuous basis, but can be selectively turned on or off via the scooter controller 118.

In another embodiment, the on-board power generating source is an internal combustion engine, such as a Honda model no. EU100I engine. This engine has an integrated fuel tank and is manually started. The single phase engine preferably drives a mechanical charging unit, such as an alternator or generator. The engine has a rated output of about 900 VA with a maximum output of about 1000 VA and cooperates with the mechanical charging unit to put out a 120 volt, 60 Hz signal for charging the batteries. This output is preferably conditioned to provide appropriate charging of the battery pack. Furthermore, because the internal combustion engine is air-breathing, air inlet and exhaust hardware are also provided in this embodiment. In addition, a gasoline fuel gauge is provided to inform the rider of the fuel level. A keyed switch to start and stop the engine is also preferably provided.

In a further embodiment, the on-board power generating source is preferably arranged to directly power the motor, and optionally is connected to charge batteries as such. In one embodiment, the batteries and the on-board power generating source can operate in parallel to power the rear wheel, for example. Other embodiments are not hybrids, and do not include an on-board power generating source. An exemplary embodiment to power the vehicle is disclosed in U.S. Pat. No. 6,047,786.

Figure 12:
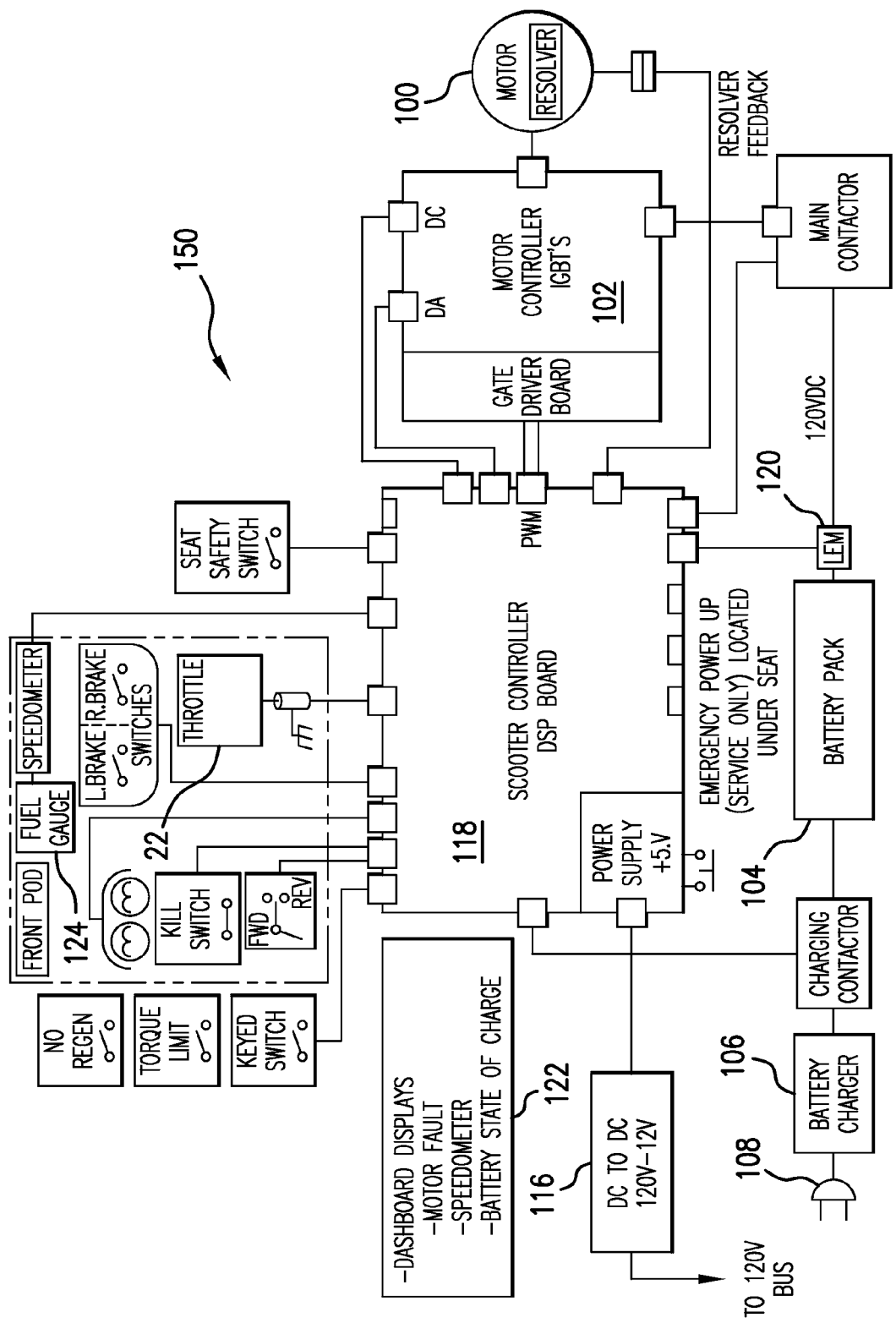
FIG. 12 is a block diagram of an electrical system thereof.

FIG. 12 illustrates the scooter motor controller 102 of the preferred embodiment in conjunction with the scooter motor 100 and the battery pack 104. Motor controller 102 preferably includes three IGBTs (insulated gate bipolar transistors). These IGBTs preferably have a peak rating of about 400 amps and about 600 volts in this embodiment, and can sustain a maximum continuous current of about 100 amps. The input voltage applied to the IGBTs in this preferred setup is the 120 volt nominal battery bank 104, which can be implemented either as lead-acid batteries typically having about a 80-130 volt operating range, Ni—Zn batteries having about a 90-140 volt operation range, or other types of batteries, such as Ni-MH.

In the embodiment of FIG. 12, the throttle can serve the dual role of demanding vehicle acceleration and also regenerative braking. The throttle 22 is preferably a bi-directional twist grip throttle. The throttle is biased toward a neutral resting position and is capable of rotating about the handle in first and second directions. Rotation of the throttle 22 from the neutral position in the first direction demands vehicle acceleration, and rotation of the throttle 22 from the neutral position in the second direction demands regenerative braking.

Additionally, rotation of the handle from the neutral position in the second direction can include a plurality of subranges. For instance, movement over a first subrange can demand regenerative braking, and movement over a second subrange can demand another type of braking. In one example, the first subrange can include a rotational displacement within about the first 25% or 10% of the range, and the second subrange can include a displacement within the remaining range of motion.

In another embodiment, the throttle 22 is biased toward a neutral resting position and is capable of rotating from the resting position about the handle in a first direction only (i.e., non-bidirectional). In such case, rotation of the throttle in the first direction from the resting position over a first subrange to first rotation position can demand regenerative braking, and further rotation of the handle from the first rotation position over a second subrange to a second rotation position can demand vehicle acceleration. In one example, the first subrange can include a rotational displacement preferably within about the first 10% to 15% of the total range, more preferably within about 10% of the total range, and the second subrange can include a displacement within the remaining range of motion. In another embodiment, a brake control, such as a hand lever or foot pedal, with a first portion of the brake control travel, such as about 10%, activates regenerative braking, and further actuation activates one or more different types of braking, such as friction braking, in addition to or instead of the regenerative braking.

Also, the throttle 22 can allow the vehicle to have reverse capability for very low-speed maneuvering (for example, with feet on the ground). Maximum driving torque in reverse would be greatly reduced and the vehicle speed would be limited to a walking pace. The rider can preferably enable reverse operation via a switch on the handlebars. In one embodiment, a twist-grip throttle allowing rotational displacement in one direction operates the vehicle in reverse when a switch on the handlebars is positioned in reverse mode. In another embodiment, the twist-grip throttle is operable in both directions relative to the neutral resting position. Preferably, twisting the handgrip in the counter-clockwise direction when viewed from the right-hand side of the vehicle will control forward throttle, while twisting the handgrip in the opposite direction will control regenerative braking in normal forward operating mode, and reverse torque in reverse mode.

In another embodiment, rider controlled regenerative braking demand is managed by an actuating device that is preferably separate from the vehicle acceleration throttle 22. The separate actuating device can be another hand-brake, a thumb lever, or a foot pedal, among others.

It can be expedient to design an electric scooter based on the expected type of setting (for example, rural vs. urban vs. extra urban) in which that scooter is expected to operate. Accordingly, one can preferably select the number and type of batteries used in the battery pack 104, based upon the expected environment in which the electric scooter is to operate. It should be evident to one of ordinary skill in the art, that reducing the number of batteries, or the rating of batteries, in the aggregate, reduces costs and overall weight of an electric scooter. Accordingly, economic benefits can be realized if electric scooters were designed with the intended operating environment in mind. For example, a scooter frame can preferably include nickel metal hydride (Ni-MH) batteries, for example, 30 amp-hour, 120 volt Ni-MH batteries. In other embodiments, the scooter can hold about 10 12-volt sealed lead-acid (SLA) batteries, each battery having about a 16 amp-hour rating for a total of approximately 1.9 kilowatt hours at 120 volts. Alternatively, each battery can have a rating of about 26 amp-hours for a total of 3.1 kilowatt hours at 120 volts. Because the 26 amp-hour batteries, however, are larger than the 16 amp-hour batteries, the larger batteries occupy more space within the frame.

In a first preferred embodiment, the battery supply 104 includes 30 amp-hour, 120 volt Ni-MH batteries. In alternative embodiments, the battery supply can include lead acid 16 or 18 amp-hour batteries. The lower amp-hour rating batteries are preferably used when the scooter is designed to commute only a small distance within an urban area, whereas the 26 amp-hour batteries are preferably used when the scooter is designed to travel in suburban as well as rural areas with a longer commuting distance. In another embodiment, nickel zinc (Ni—Zn) batteries or lithium ion batteries can be used instead of the lead-acid type. Alternative embodiments can also include other types of batteries or power storage devices.

In the preferred embodiment, a battery charger is preferably included to charge the batteries from an external power source. The battery charger can preferably be plugged into a 120 volt, 60 Hz AC power supply or a 220 volt, 50 Hz AC power supply.

In another embodiment, capacitors are used in combination with batteries, and in a further embodiment, capacitors are used instead of batteries. For example, ultra-capacitors can take a charge and release it at a faster rate, and in some applications, ultra-capacitors can be superior to batteries in delivering load currents to the motor when accelerating. Power management and electronic controls for capacitors can be simpler than for batteries.

Figure 13:
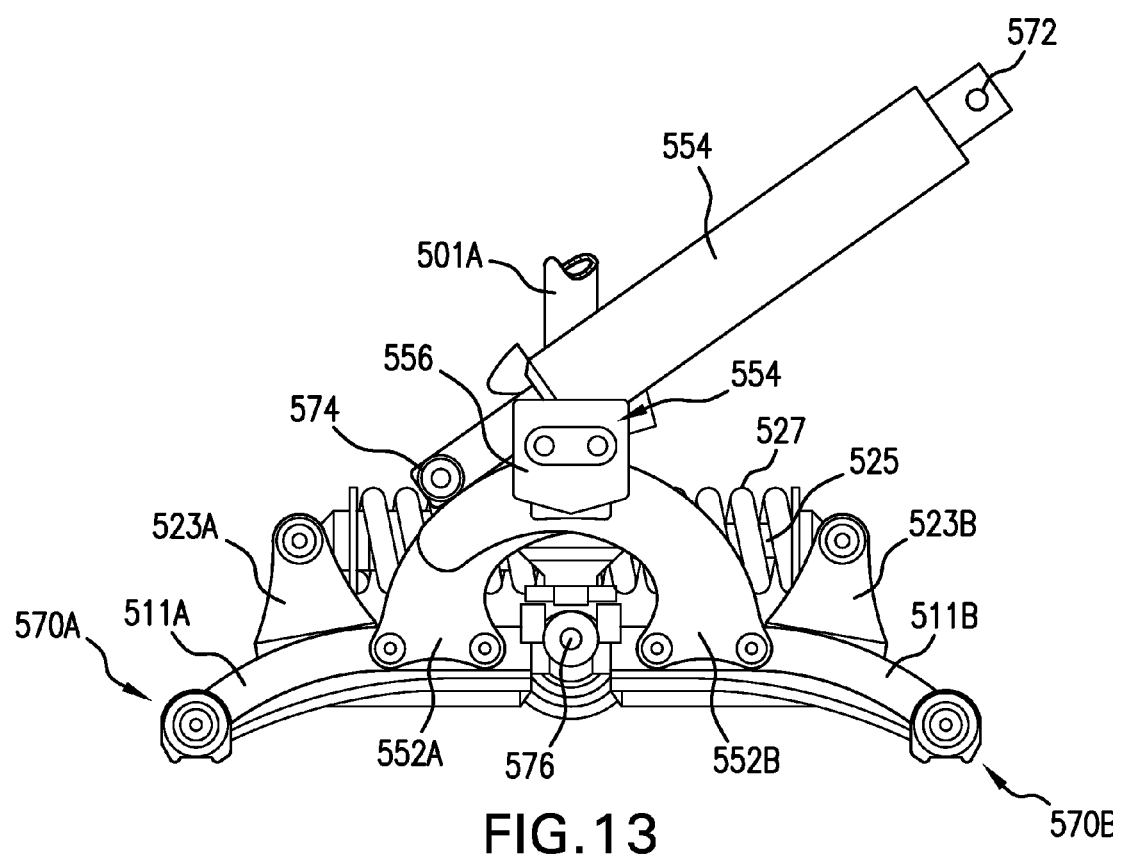
FIG. 13 is front view showing a tilt-limiter of another embodiment.

Referring to FIG. 13, another embodiment has a tilt-limiting member 552A,552B attached to each side of the tilt-mechanism, preferably to each upper suspension arm 511A, 511B. Caliper 552A of the braking member 554 is preferably operable to engage both tilt-limiting members 552A,552B, which as in the previously described embodiments, are curved brakes of materials suitable for disk brakes. The curvature and length of the tilt-limiting members 552A,552B is selected so that regardless of the position of the left and right linkages 570A,570B, the tilt-limiting members 552A,552B remain in a position extending through the caliper, although alternatively, the tilt-limiting members 552A,552B are made shorter. When the braking member 554 is engaged, it locks the movement of both right and left linkages 570A,570B, and simultaneously blocks relative movement therebetween, effectively locking out the shock-absorber and spring of the suspension system as well. The calipers can preferably be suddenly or gradually activated or released to suddenly lock out the tilting system or to do so gradually.

Tilt adjusting member 554 is mounted preferably to the vehicle body at one end 572 and to the braking member 554 at its other end 574. The caliper 556 of the braking member 554 is preferably pivotally mounted with respect to the vehicle body, such as about hinge pin 576 which extends substantially longitudinally. Preferably, the suspension arms 511A,511B to which the tilt-limiting members 552A,552B are attached are also hinged from the same pivot pin 576 to maintain a generally concentric relationship between the caliper and the curvature of the tilt-limiting members 552A 552B. The tilt-adjusting member is actuatable, manually or automatically as described in relation to the previous embodiments, to rotate the caliper 556 about the pivot pin 576. In this manner, when the caliper 556 is closed to grip the two tilt-limiting members 552A,552B, the tilt-adjusting member is configured to move the brake member 554 and thus pivot the linkages 570 that are locked therewith to adjust and control the tilt of the vehicle, when the tilt-adjusting member varies its length.

Tilt-adjusting member 554 is preferably a linear actuator in this embodiment, such as motor-controlled lead screw. Other linear or non-linear actuators can alternatively be used to move the caliper 554 to adjust the tilt.

The term "about," as used herein, should generally be understood to refer to both the corresponding number and a range of numbers. Moreover, all numerical ranges herein should be understood to include each whole integer within the range.

While illustrative embodiments of the invention are disclosed herein, it will be appreciated that numerous modifications and other embodiments can be devised by those skilled in the art. Features of the embodiments described herein, can be combined, separated, interchanged, and/or rearranged to generate other embodiments. Therefore, it will be understood that the appended claims are intended to cover all such modifications and embodiments that come within the spirit and scope of the present invention.

What is claimed is:

1. A vehicle support assembly, comprising:
    first and second tilting wheels disposed respectively at different lateral positions with respect to a longitudinal axis;
    a tilt-mechanism configured for supportively associating a vehicle body from the tilting wheels to enable the vehicle body to tilt substantially freely through a first tilt range with respect to a surface on which the tilting wheels are disposed; and
    a tilt-limiter operably associated with the tilt-mechanism to restrict the tilting of the vehicle body to less than the first tilt range, and releasable to allow the tilting through the first tilt range,
    wherein the tilt mechanism includes a front suspension system including a transverse shock absorber configured for absorbing shocks between the first and second wheels and the vehicle body, and the tilt limiter is configured for locking the suspension system to prevent relative movement between the first and second wheels when the tilt limiter is operated to restrict the tilting.

2. A vehicle, comprising:
    the support assembly of claim 1;
    a vehicle body in supported association with the tilt-mechanism for tilting laterally;
    a plurality of batteries housed within the vehicle body; and
    an electric motor powered by the batteries and configured to propel the vehicle body.

3. The vehicle support assembly of claim 1, further comprising:
    a sensor configured to sense a parameter related to the movement of the vehicle; and
    a tilt-limiter controller configured to operate the tilt-limiter to restrict or allow the tilting of the vehicle body based on a value of the sensed parameter.

4. The vehicle support assembly of claim 1, further comprising:
    an inclination sensor configured to sense the inclination of the vehicle with respect to the vertical at least when the vehicle is at rest; and
    a tilt adjusting mechanism operatively associated with the inclination sensor and tilt-mechanism to reposition the tilt-mechanism to adjust the inclination of the vehicle body to a predetermined inclination with respect to the vertical based on the sensed inclination when the tilt-limiter is engaged.

5. The vehicle support assembly of claim 1, wherein the tilt-limiter is operable to lock the tilt-mechanism to fix the vehicle body in a locked tilt position.

6. The vehicle support assembly of claim 1, wherein the tilt-limiter is operable to restrict said tilting to within a second tilt range that is smaller than the first tilt range.

7. The vehicle support assembly of claim 1, wherein:
    the tilt-mechanism is configured to allow the tilting wheels to move vertically with respect to each other and the vehicle body as the vehicle tilts with the tilting wheels remaining generally in a same inclination with respect to the vehicle body;
    the tilting wheels are disposed on opposite lateral sides of the vehicle body; and
    the tilt-mechanism allows the each of the first and second tilting wheels to concurrently move vertically in opposite directions from each other with respect to the vehicle body.

8. The vehicle support assembly of claim 1, further comprising a steering mechanism that includes a handle bar for steering the first and second wheels for steering the vehicle while substantially retaining longitudinal positions and inclinations of the wheels relative to the body and handle bar, wherein the tilt-mechanism is associated with the steering mechanism to enable the tilting substantially independent of the handlebar.

9. The vehicle support assembly of claim 1, wherein the tilt mechanism includes left and right linkages connected, respectively, to first and second tilting wheels; and the suspension system is connected between the left and right linkages for absorbing shocks upon independent movement of the left and right linkages with respect to each other; and the tilt limiter is configured for fixing the position of both the left and right linkages with respect to the body.

10. The vehicle support assembly of claim 9, further comprising a tilt adjusting mechanism operatively associated with the tilt limiter to move the tilt-limiter with respect to the vehicle body, such that when the tilt limiter is engaged to restrict the tilting, the tilt adjusting mechanism moves the left and right linkages via the tilt-limiter to adjust the vehicle tilt.

11. The vehicle support assembly of claim 9, wherein the suspension system is configured to allow the first and second linkages to move vertically in a same direction with respect to the vehicle body.

12. The vehicle support assembly of claim 1, further including a button actuator and a controller, the button actuator actuatable by a rider to cause the controller to automatically engage and disengage the tilt limiter based upon predetermined conditions.

13. The vehicle support assembly of claim 1, further including a button actuator and a controller, the button actuator manually actuatable by a rider to cause the controller to engage and disengage the tilt limiter.

14. A vehicle support assembly, comprising:
first and second tilting wheels disposed respectively at different lateral positions with respect to a longitudinal axis;
a tilt-mechanism configured for supportively associating a vehicle body from the tilting wheels to enable the vehicle body to tilt through a first tilt range with respect to a surface on which the tilting wheels are disposed;
a tilt-limiter operably associated with the tilt-mechanism to restrict the tilting of the vehicle body to less than the first tilt range, and releasable to allow the tilting through the first tilt range;
a speed sensor configured to sense speed of the vehicle; and
a tilt-limiter controller configured to engage the tilt-limiter to restrict the tilting of the vehicle body based on a sensed speed falling below a predetermined deceleration speed threshold and disengage the tilt limiter to allow tilting of the vehicle body based on sensed speed rising above an acceleration speed threshold,
wherein the tilt mechanism includes a front suspension system including a transverse shock absorber configured for absorbing shocks between the first and second wheels and the vehicle body, and the tilt-limiter is configured for locking the suspension system to prevent relative movement between the first and second wheels when the tilt limiter is operated to restrict the tilting.

15. The vehicle support assembly of claim 14, further comprising:
an inclination sensor configured to sense the inclination of the vehicle with respect to the vertical at least when the vehicle is at rest; and
a tilt adjusting mechanism operatively associated with the inclination sensor and tilt-mechanism to reposition the tilt-mechanism to adjust the inclination of the vehicle body to a predetermined inclination with respect to the vertical based on the sensed inclination when the tilt-limiter is engaged.

16. A vehicle support assembly, comprising:
first and second tilting wheels disposed respectively at different lateral positions with respect to a longitudinal axis;
a tilt-mechanism configured for supportively associating a vehicle body from the tilting wheels to enable the vehicle body to tilt through a first tilt range with respect to a surface on which the tilting wheels are disposed;
an inclination sensor configured to sense the inclination of the vehicle body with respect to the vertical at least when the vehicle body is at rest;
a tilt-limiter operably associated with the tilt-mechanism to restrict the tilting of the vehicle body to less than the first tilt range, and releasable to allow the tilting through the first tilt range; and
a tilt adjusting mechanism operatively associated with the inclination sensor and tilt-mechanism to reposition the tilt-mechanism to adjust the inclination of the vehicle body to a predetermined inclination with respect to the vertical based on the sensed inclination when the tilt-limiter is engaged,
wherein the tilt-mechanism includes a front suspension system including a transverse shock absorber configured for absorbing shocks between the first and second wheels and the vehicle body, and the tilt-limiter is configured for locking the suspension system to prevent relative movement between the first and second wheels when the tilt limiter is operated to restrict the tilting.

* * * * *